(12) United States Patent
Ford et al.

(10) Patent No.: US 11,704,437 B2
(45) Date of Patent: *Jul. 18, 2023

(54) GRACEFULLY HANDLING ENDPOINT FEEDBACK WHEN STARTING TO MONITOR

(71) Applicant: Forcepoint, LLC, Austin, TX (US)

(72) Inventors: Richard A. Ford, Austin, TX (US); Ann Irvine, Baltimore, MD (US); Adam Reeve, Redmond, WA (US); Russell Snyder, Baltimore, MD (US); Benjamin Shih, Baltimore, MD (US)

(73) Assignee: Forcepoint Federal Holdings LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,052

(22) Filed: Apr. 25, 2022

(65) Prior Publication Data

US 2022/0245280 A1    Aug. 4, 2022

Related U.S. Application Data

(63) Continuation of application No. 16/880,299, filed on May 21, 2020, now Pat. No. 11,314,896, which is a
(Continued)

(51) Int. Cl.
*G06F 21/62* (2013.01)
*G06F 11/34* (2006.01)
(Continued)

(52) U.S. Cl.
CPC ...... *G06F 21/6245* (2013.01); *G06F 11/3438* (2013.01); *G06F 21/552* (2013.01);
(Continued)

(58) Field of Classification Search
CPC ............ G06F 21/6245; G06F 11/3438; G06F 21/552; G06F 21/577; G06F 21/602;
(Continued)

(56) References Cited

U.S. PATENT DOCUMENTS 6,366,926 B1    4/2002  Pohlmann et al.
8,863,297 B2   10/2014  Sharma et al.
(Continued)

OTHER PUBLICATIONS

Ramit Choudhary, Introduction to Anomaly Detection, Oracle Data Science, Feb. 15, 2017 https://blogs.oracle.com/datascience/introduction-to-anomaly-detection.
(Continued)

*Primary Examiner* — Darren B Schwartz
(74) *Attorney, Agent, or Firm* — Terrile, Cannatti & Chambers; Stephen A. Terrile

(57) ABSTRACT

A method, system and computer-usable medium for adaptively assessing risk associated with an endpoint, comprising: determining a risk level corresponding to an entity associated with an endpoint; selecting a frequency and a duration of an endpoint monitoring interval; collecting user behavior to collect user behavior associated with the entity for the duration of the endpoint monitoring interval via the endpoint; processing the user behavior to generate a current risk score for the entity; comparing the current risk score of the user to historical risk scores to determine whether a risk score of a user has changed; and changing the risk score of the user to the current risk score when the risk score of the user has changed.

14 Claims, 14 Drawing Sheets

Related U.S. Application Data continuation of application No. 16/295,429, filed on Mar. 7, 2019, now Pat. No. 10,664,614, which is a continuation of application No. 16/045,297, filed on Jul. 25, 2018, now Pat. No. 10,642,997.

(60) Provisional application No. 62/537,102, filed on Jul. 26, 2017.

(51) Int. Cl.
| | |
|---|---|
| *G06F 21/55* | (2013.01) |
| *G06F 21/57* | (2013.01) |
| *G06F 21/60* | (2013.01) |
| *G06F 21/84* | (2013.01) |
| *H04L 9/40* | (2022.01) |
| *H04L 67/025* | (2022.01) |
| *H04L 67/141* | (2022.01) |
| *H04L 67/146* | (2022.01) |
| *H04L 67/306* | (2022.01) |
| *H04L 67/50* | (2022.01) |
| *H04L 67/289* | (2022.01) |
| *G06F 11/30* | (2006.01) |

(52) U.S. Cl.
CPC .......... *G06F 21/577* (2013.01); *G06F 21/602* (2013.01); *G06F 21/6254* (2013.01); *G06F 21/84* (2013.01); *H04L 63/1408* (2013.01); *H04L 63/1425* (2013.01); *H04L 63/1433* (2013.01); *H04L 63/1441* (2013.01); *H04L 67/025* (2013.01); *H04L 67/141* (2013.01); *H04L 67/146* (2013.01); *H04L 67/306* (2013.01); *H04L 67/535* (2022.05); *G06F 2221/031* (2013.01); *G06F 2221/032* (2013.01); *G06F 2221/034* (2013.01); *H04L 63/20* (2013.01); *H04L 67/289* (2013.01); *H04L 2209/16* (2013.01)

(58) Field of Classification Search
CPC ............... G06F 21/6254; G06F 21/84; G06F 2221/031; G06F 2221/032; G06F 2221/034; G06F 11/3072; G06F 2201/86; H04L 63/1408; H04L 63/1425; H04L 63/1433; H04L 63/1441; H04L 67/025; H04L 67/141; H04L 67/146; H04L 67/306; H04L 67/535; H04L 63/20; H04L 67/289; H04L 2209/16
See application file for complete search history.

(56) References Cited

U.S. PATENT DOCUMENTS

| | | | |
|---|---|---|---|
| 8,955,091 | B2 | 2/2015 | Kailash et al. |
| 9,081,940 | B2 | 7/2015 | Trevor et al. |
| 10,108,791 | B1 | 10/2018 | Masterman |
| 10,122,748 | B1 * | 11/2018 | Currie ................. H04L 63/1433 |
| 10,147,065 | B1 | 12/2018 | Yiftachel et al. |
| 10,496,815 | B1 | 12/2019 | Steiman et al. |
| 2002/0104014 | A1 | 8/2002 | Zobel et al. |
| 2002/0156601 | A1 | 10/2002 | Tu et al. |
| 2003/0093479 | A1 | 5/2003 | Mellen-Garnett et al. |
| 2003/0105801 | A1 | 6/2003 | Fse et al. |
| 2005/0229183 | A1 | 10/2005 | Araujo et al. |
| 2008/0086759 | A1 | 4/2008 | Colson |
| 2008/0288330 | A1 | 11/2008 | Hildebrand et al. |
| 2009/0177985 | A1 | 7/2009 | Mueller et al. |
| 2009/0199264 | A1 | 8/2009 | Lang |
| 2010/0064341 | A1 | 3/2010 | Mdera |
| 2010/0169474 | A1 | 7/2010 | Beckett, III et al. |
| 2010/0212010 | A1 | 8/2010 | Stringer et al. |
| 2011/0225650 | A1 | 9/2011 | Margolies et al. |
| 2011/0246460 | A1 | 10/2011 | Hsieh et al. |
| 2011/0246988 | A1 | 10/2011 | Hui et al. |
| 2011/0307957 | A1 | 12/2011 | Barcelo et al. |
| 2013/0246605 | A1 | 9/2013 | Mahadik et al. |
| 2014/0007132 | A1 | 1/2014 | Gaxiola et al. |
| 2014/0331278 | A1 | 11/2014 | Tkachev |
| 2015/0074750 | A1 | 3/2015 | Pearcy et al. |
| 2015/0178486 | A1 | 6/2015 | Bentley et al. |
| 2015/0229624 | A1 | 8/2015 | Grigg et al. |
| 2015/0339477 | A1 | 11/2015 | Abrams et al. |
| 2016/0004862 | A1 | 1/2016 | Mmehmadi et al. |
| 2016/0180078 | A1 | 6/2016 | Chhabra et al. |
| 2016/0205106 | A1 | 7/2016 | Yacoub et al. |
| 2016/0226911 | A1 | 8/2016 | Boss et al. |
| 2016/0232352 | A1 | 8/2016 | Chen et al. |
| 2016/0232353 | A1 | 8/2016 | Gupta et al. |
| 2016/0248797 | A1 | 8/2016 | Yampolskiy et al. |
| 2016/0321352 | A1 | 11/2016 | Patel et al. |
| 2016/0328562 | A1 | 11/2016 | Saxena et al. |
| 2016/0357778 | A1 | 12/2016 | MacKenzie et al. |
| 2017/0070506 | A1 | 3/2017 | Reddy et al. |
| 2017/0161503 | A1 | 6/2017 | Seigel et al. |
| 2017/0230417 | A1 | 8/2017 | Amar et al. |
| 2017/0286671 | A1 | 10/2017 | Chari et al. |
| 2017/0374094 | A1 | 12/2017 | Agarmore et al. |
| 2018/0004948 | A1 * | 1/2018 | Martin ................ H04L 63/1425 |
| 2018/0004961 | A1 * | 1/2018 | Gil ........................ G06F 21/577 |
| 2018/0027006 | A1 | 1/2018 | Zimmermann et al. |
| 2018/0063178 | A1 * | 3/2018 | Jadhav ................ H04L 63/1433 |
| 2018/0084012 | A1 | 3/2018 | Joseph et al. |
| 2018/0124091 | A1 | 5/2018 | Sweeney et al. |
| 2018/0218157 | A1 | 8/2018 | Price et al. |
| 2018/0302266 | A1 | 10/2018 | Makovsky et al. |
| 2018/0307833 | A1 | 10/2018 | Noeth et al. |
| 2018/0309795 | A1 | 10/2018 | Ithal et al. |
| 2018/0316684 | A1 | 11/2018 | Desai et al. |
| 2018/0337971 | A1 | 11/2018 | Aleksandrov |
| 2018/0341758 | A1 | 11/2018 | Park et al. |
| 2019/0066670 | A1 | 2/2019 | White et al. |
| 2019/0205533 | A1 | 7/2019 | Diehl et al. |
| 2019/0318128 | A1 | 10/2019 | Ackerman et al. |

OTHER PUBLICATIONS

Anomaly, Detecting Anomalies with Moving Median Decomposition, Jan. 12, 2016 https://anomaly.io/anomaly-detection-moving-median-decomposition/.

NRCS, U.S. Department of Agriculture, Natural Resources Conservation Service, Media vs. Average to Describe Normal, downloaded Jul. 8, 2020, https://www.wcc.nrcs.usda.gov/normals/median_average.htm.

The Mitre Corporation, Mitre Att&ck, Enterprise Matrix screenshot, Jul. 2, 2020, https://attack.mitre.org/matrices/enterprise/.

Du et al., Defense Deployment with Network Egress and Ingress Filtering, 2010, IEEE, pp. 1-6.

Manusankar et al., Intrusion Detection System with Packet Filtering for IP Spoofing, Dec. 29, 2010, IEEE pp. 563-567.

Papagiannapoulou et al., Concept-Based Image Clustering and Summarization of Event-Related Image Collections, Nov. 7, 2014, ACM, pp. 23-28.

Goebel et al., Comparing Ingress and Egress Detection to Secure Interdomain Routing: An Experimental Analysis, Dec. 2011, ACM, vol. 11, No. 2, Article 5, pp. 5:1-5:26.

\* cited by examiner

GRACEFULLY HANDLING ENDPOINT FEEDBACK WHEN STARTING TO MONITOR

BACKGROUND OF THE INVENTION

Field of the Invention

The present invention relates in general to the field of computers and similar technologies, and in particular to software utilized in this field. Still more particularly, it relates to a method, system and computer-usable medium for adaptively assessing risk associated with an endpoint.

Description of the Related Art

Users interact with physical, system, data, and services resources of all kinds, as well as each other, on a daily basis. Each of these interactions, whether accidental or intended, poses some degree of security risk. However, not all behavior poses the same risk. Furthermore, determining the extent of risk corresponding to individual events can be difficult.

However, not all user behavior poses the same risk. For example, a user accessing an organization's proprietary resources poses a higher risk than the same user perusing an online website during working hours. Consequently, indiscriminately applying the same policy to all user behavior instead of adjusting security oversight accordingly may result in inefficient utilization of security system resources. However, identifying what may be anomalous, abnormal, unexpected, or malicious user behavior can often prove challenging, as such behavior may not be readily apparent when employing typical security monitoring and risk assessment approaches.

SUMMARY OF THE INVENTION

A method, system and computer-usable medium are disclosed for adaptively assessing risk associated with an endpoint.

In one embodiment, the invention relates to a method for adaptively assessing risk associated with an endpoint, comprising: determining a risk level corresponding to an entity associated with an endpoint; selecting a frequency and a duration of an endpoint monitoring interval; collecting user behavior to collect user behavior associated with the entity for the duration of the endpoint monitoring interval via the endpoint; processing the user behavior to generate a current risk score for the entity; comparing the current risk score of the user to historical risk scores to determine whether a risk score of a user has changed; and changing the risk score of the user to the current risk score when the risk score of the user has changed.

In another embodiment, the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: determining a risk level corresponding to an entity associated with an endpoint; selecting a frequency and a duration of an endpoint monitoring interval; collecting user behavior to collect user behavior associated with the entity for the duration of the endpoint monitoring interval via the endpoint; processing the user behavior to generate a current risk score for the entity; comparing the current risk score of the user to historical risk scores to determine whether a risk score of a user has changed; and changing the risk score of the user to the current risk score when the risk score of the user has changed.

In another embodiment, the invention relates to a non-transitory, computer-readable storage medium embodying computer program code, the computer program code comprising computer executable instructions configured for: determining a risk level corresponding to an entity associated with an endpoint; selecting a frequency and a duration of an endpoint monitoring interval; collecting user behavior to collect user behavior associated with the entity for the duration of the endpoint monitoring interval via the endpoint; processing the user behavior to generate a current risk score for the entity; comparing the current risk score of the user to historical risk scores to determine whether a risk score of a user has changed; and changing the risk score of the user to the current risk score when the risk score of the user has changed.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
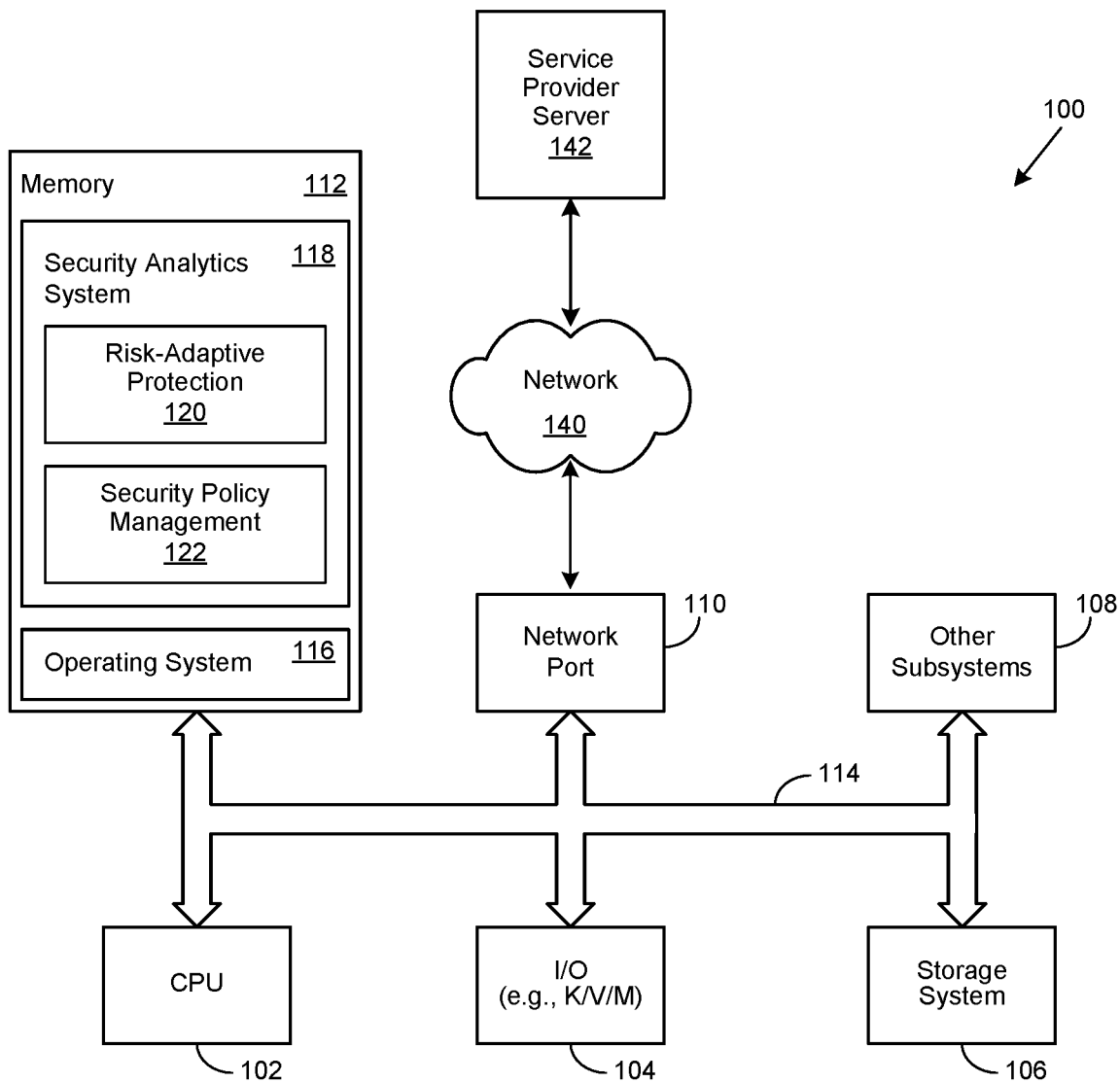
FIG. 1 depicts an exemplary client computer in which the present invention may be implemented.

A method, system and computer-usable medium are disclosed for adaptively assessing risk associated with an endpoint. Certain aspects of the invention reflect an appreciation that it may have been determined that a first user is a high security risk and a second user is a low security risk. Accordingly, typical security approaches would monitor the activity of the first user more closely than the activity of the second user. Consequently, any suspicious behavior associated with the first user would likely reinforce the assessment of their high security risk. However, suspicious behavior associated with the second user may go unnoticed due to not being as closely monitored.

Certain aspects of the invention likewise reflect an appreciation that one approach to this issue is to sample the behavior of a user, regardless of whether or not they are considered to be a security risk, on a recurring basis and make an assessment of the risk they pose. Accordingly, a user considered to be a high security risk may become less risky over time. Likewise, it may be discovered that a user initially considered to a low security risk may actually pose a higher security risk, especially if they enact risky behavior on an infrequent basis.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In certain embodiments, the security analytics system 118 may include a risk-adaptive protection 120 module, a security policy management 122 module, or a combination thereof. In one embodiment, the information handling system 100 is able to download the security analytics system 118 from the service provider server 142. In another embodiment, the security analytics system 118 is provided as a service from the service provider server 142.

In various embodiments, the security analytics system 118 adaptively performs an endpoint risk assessment operation. In certain embodiments, adaptively performing the endpoint risk assessment operation improves processor efficiency, and thus the efficiency of the information handling system 100, by adaptively assessing risk associated with an endpoint. As will be appreciated, once the information handling system 100 is configured to adaptively perform the endpoint risk assessment operation, the information handling system 100 becomes a specialized computing device specifically configured to adaptively perform the endpoint risk assessment operation and is not a general purpose computing device. Moreover, the implementation of the security analytics system 118 on the information handling system 100 improves the functionality of the information handling system 100 and provides a useful and concrete result of adaptively assessing endpoint risk.

Figure 2:
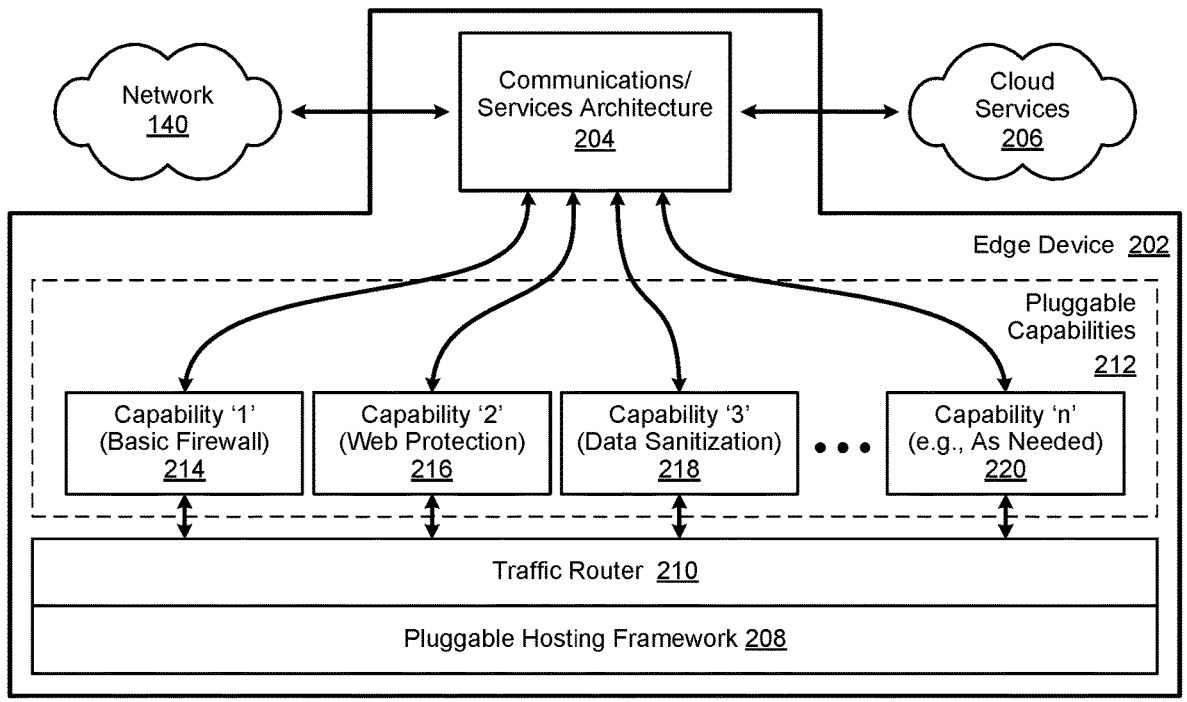
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis.

In certain embodiments, such capabilities may include the performance of certain risk-adaptive operations associated with detecting anomalous, abnormal, unexpected or malicious user behavior and adaptively responding to mitigate risk, as described in greater detail herein. As used herein, a user behavior broadly refers to any behavior exhibited or enacted by a user. In certain embodiments, the user may be an entity, described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
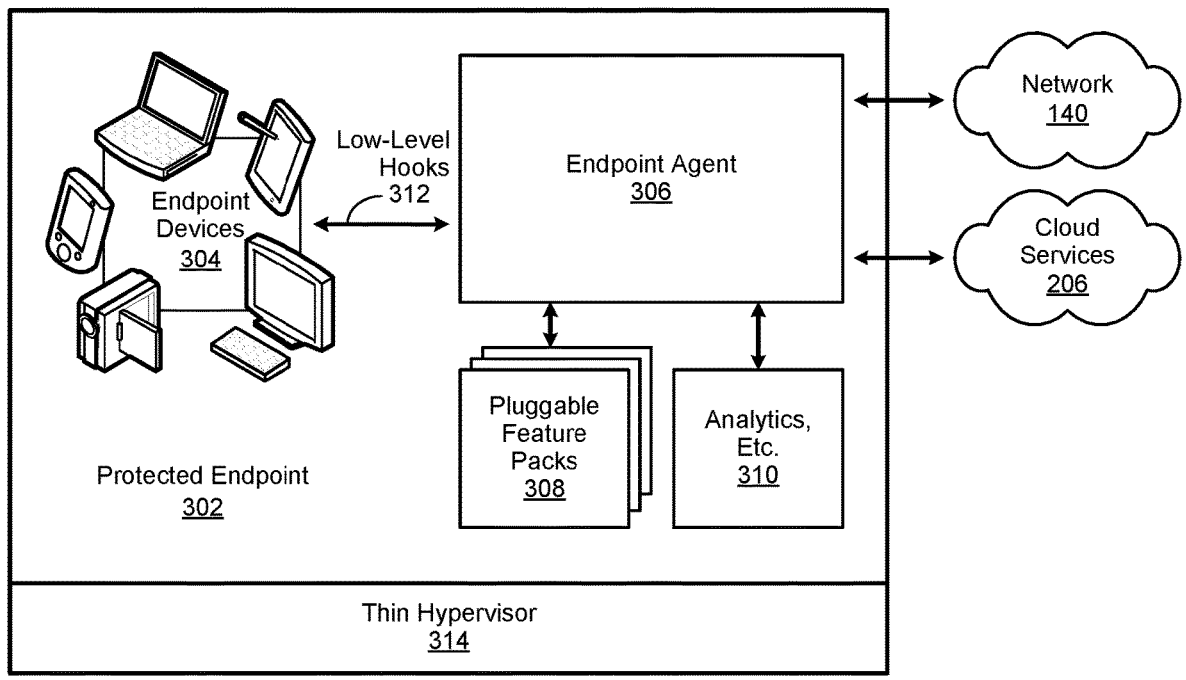
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In various embodiments, the protected endpoint 302 may be implemented to perform operations associated with the detection of anomalous, abnormal, unexpected or malicious user behavior and adaptively responding to mitigate risk, as described in greater detail herein. In various embodiments, the protected endpoint may be implemented to collect and provide certain information associated with an event, described in greater detail herein. In certain embodiments, the protected endpoint 302 may be implemented to provide temporal information, such as timestamp information, associated with such operations.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with detecting anomalous, abnormal, unexpected or malicious user behavior and adaptively responding to mitigate risk, as described in greater detail herein.

In certain embodiments, a particular pluggable feature pack 308 may be invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 may be invoked by the endpoint agent 306 according to the occurrence of a particular user behavior, a particular event, or a combination thereof, as described in greater detail herein. In certain embodiments, the individual features of a pluggable feature pack 308 may be invoked by the endpoint agent 306 at a particular point in time. In these embodiments, the method by which a given user behavior, event, or point in time is selected to invoke the endpoint agent 306 is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the event analytics 310 functionality may include analysis of a particular event. In certain embodiments, the particular event may be associated with one or more user behaviors. In certain embodiments, the event analytics 310 functionality may include detecting anomalous, abnormal, unexpected or malicious user behavior and adaptively responding to mitigate risk, as described in greater detail herein.

In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
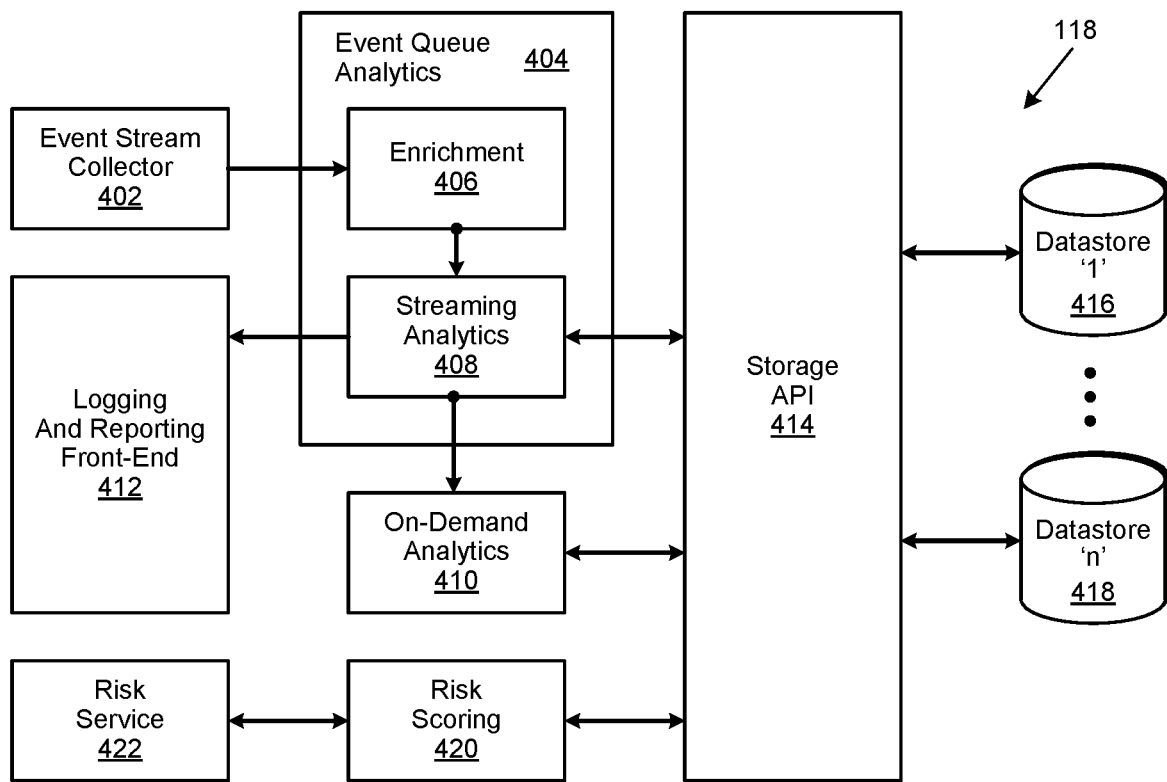
FIG. 4 is a simplified block diagram of a security analytics system.

FIG. 4 is a simplified block diagram of a security analytics system implemented in accordance with an embodiment of the invention. In certain embodiments, the security analytics system 118 shown in FIG. 4 may include an event queue analytics 404 module, described in greater detail herein. In certain embodiments, the event queue analytics 404 subsystem may be implemented to include an enrichment 406 module and a streaming analytics 408 module. In certain embodiments, the security analytics system 118 may be implemented to provide log storage, reporting, and analytics capable of performing streaming 408 and on-demand 410 analytics operations. In certain embodiments, such operations may be associated with defining and managing a user profile, detecting anomalous, abnormal, unexpected or malicious user behavior, adaptively responding to mitigate risk, or a combination thereof, as described in greater detail herein.

In certain embodiments, the security analytics system 118 may be implemented to provide a uniform platform for storing events and contextual information associated with various user behaviors and performing longitudinal analytics. As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular period of time or at a particular point in time, may represent suspicious user behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information processing systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 may be implemented to collect event and related contextual information, described in greater detail herein, associated with various user behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched user behavior information. In certain embodiments, the enrichment may include certain contextual information related to a particular user behavior or event. In certain embodiments, the enrichment may include certain temporal information, such as timestamp information, related to a particular user behavior or event.

In certain embodiments, enriched user behavior information may be provided by the enrichment module 406 to a streaming 408 analytics module. In turn, the streaming 408 analytics module may provide some or all of the enriched user behavior information to an on-demand 410 analytics module. As used herein, streaming 408 analytics broadly refers to analytics performed in near real-time on enriched user behavior information as it is received. Likewise, on-demand 410 analytics broadly refers herein to analytics performed, as they are requested, on enriched user behavior information after it has been received. In certain embodiments, the enriched user behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched user behavior associated with a particular interval of, or point in, time. In certain embodiments, the streaming 408 or on-demand 410 analytics may be performed on enriched user behavior associated with a particular user, group of users, one or more entities, or a combination thereof. In certain embodiments, the streaming 408 or on-demand 410 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 412 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing a user profile, as described in greater detail herein. In certain embodiments, the risk management service 422 may be implemented to perform operations associated with detecting anomalous, abnormal, unexpected or malicious user behavior and adaptively responding to mitigate risk, as described in greater detail herein. In certain embodiments, the risk management service 422 may be implemented to provide the results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
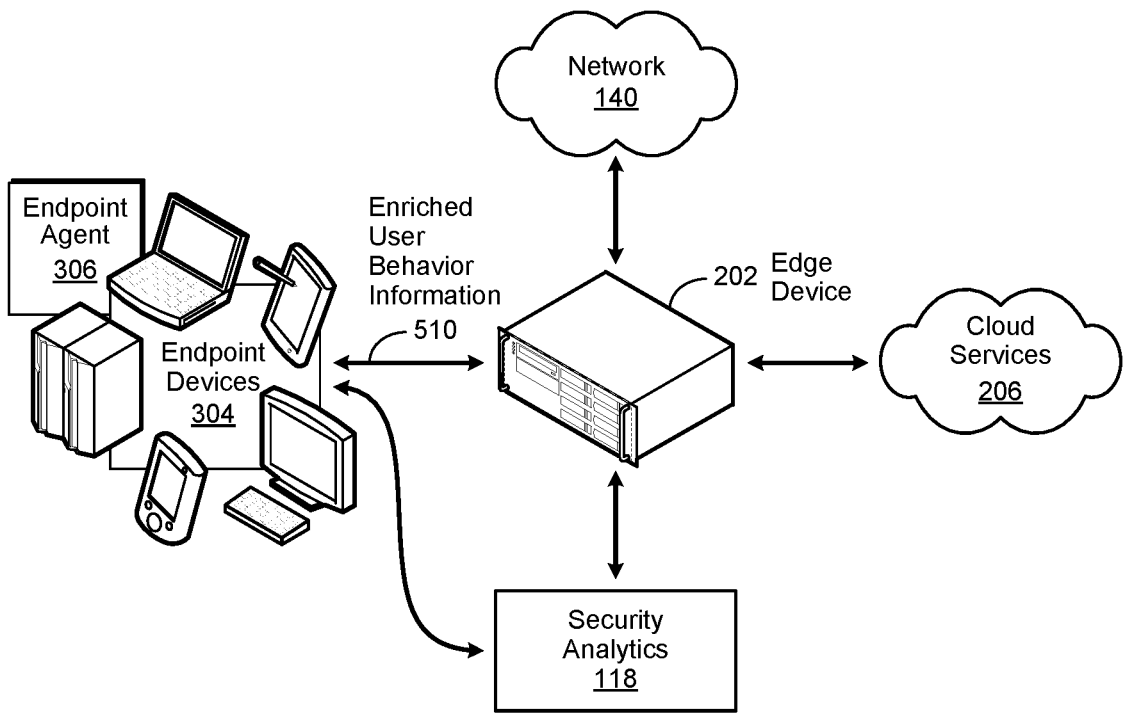
FIG. 5 is a simplified block diagram of the operation of a security analytics system.

FIG. 5 is a simplified block diagram of the operation of a security analytics system implemented in accordance with an embodiment of the invention. In certain embodiments, the security analytics system 118 may be implemented to perform operations associated with detecting anomalous, abnormal, unexpected or malicious user behavior and adaptively responding to mitigate risk, as described in greater detail herein. In certain embodiments, the security analytics system 118 may be implemented in combination with one or more endpoint agents 306, one or more edge devices 202, various cloud services 206, and a network 140 to perform such operations.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from an endpoint agent 306, likewise described in greater detail herein.

In certain embodiments, the security analytics system 118 may be implemented as both a source and a sink of user behavior information. In certain embodiments, the security analytics system 118 may be implemented to serve requests for user/resource risk data. In certain embodiments, the edge device 202 and the endpoint agent 306, individually or in combination, may provide certain user behavior information to the security analytics system 118 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint device 304 is not implemented for a corresponding endpoint agent 306. However, the lack of such enriched user behavior information 510 may be accommodated in various embodiments, albeit with reduced functionality related to operations associated with defining and managing a user profile, detecting anomalous, abnormal, unexpected or malicious user behavior, mitigating associated risk, or a combination thereof.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Certain embodiments of the invention reflect an appreciation that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores associated with a particular event on a per-user basis may be requested. In certain embodiments, the service may be requested from the security analytics system 118. In certain embodiments, the service may be requested from various cloud services 206.

In certain embodiments, contextual information associated with a particular user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests.

In certain embodiments, the security analytics system 118 may be implemented in different operational configurations. In certain embodiments, the security analytics system 118 may be implemented by using the endpoint agent 306. In certain embodiments, the security analytics system 118 may be implemented by using endpoint agent 306 in combination with the edge device 202. In certain embodiments, the cloud services 206 may likewise be implemented for use by the endpoint agent 306, the edge device 202, and the security analytics system 118, individually or in combination. In these embodiments, the security analytics system 118 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 118 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 118 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 118 may be coupled such that requests can be contextualized and fitted into a framework that evaluates their associated risk. Certain embodiments of the invention reflect an appreciation that such an approach works well with web-based data loss protection (DLP) approaches, as each transfer is no longer examined in isolation, but in the broader context of an identified user's actions, at a particular time, on the network 140.

As another example, the security analytics system 118 may be implemented to perform risk scoring processes to decide whether to block or allow unusual flows. Certain embodiments of the invention reflect an appreciation that such an approach is highly applicable to defending against point-of-sale (POS) malware, a breach technique that has become increasingly more common in recent years. Certain embodiments of the invention likewise reflect an appreciation that while various edge device 202 implementations may not stop all such exfiltrations, they may be able to complicate the task for the attacker.

In certain embodiments, the security analytics system 118 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the security analytics system 118 can provide intelligent protection, making decisions that make sense in the broader context of an organization's activities. Certain embodiments of the invention reflect an appreciation that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
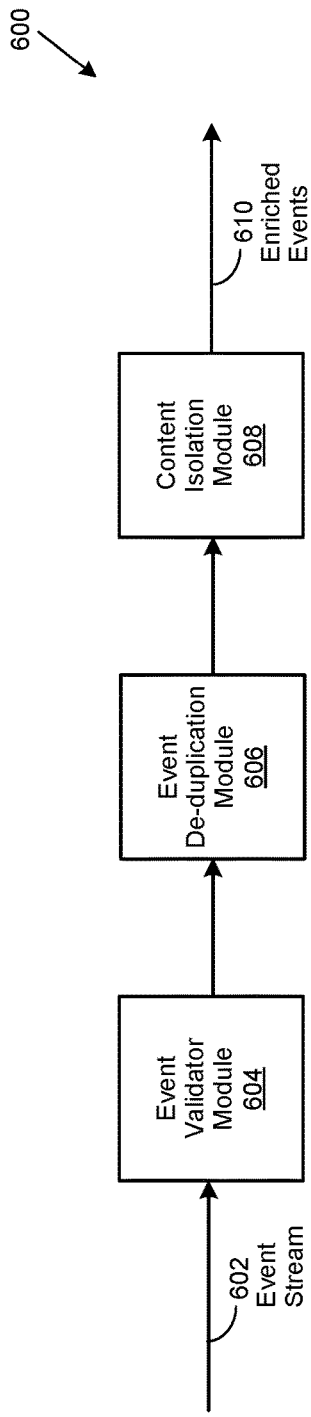
FIG. 6 is a generalized process flow diagram of the performance of event enrichment operations.

FIG. 6 is a generalized process flow diagram of the performance of event enrichment operations implemented in accordance with an embodiment of the invention. As used herein, an event broadly refers to the occurrence of an action performed by an entity. In certain embodiments, the action may be directly associated with a user behavior, described in greater detail herein. As an example, a first user may attach a binary file infected with a virus to an email that is subsequently sent to a second user. In this example, the act of attaching the binary file to the email is directly associated with a user behavior enacted by the first user. In certain embodiments, the action may be indirectly associated with a user behavior. To extend the example, the recipient of the email may open the infected binary file, and as a result, infect their computer with malware. To continue the example, the act of opening the infected binary file is directly associated with a user behavior enacted by the second user. However, the infection of the email recipient's computer by the infected binary file is indirectly associated with the described user behavior enacted by the second user.

As likewise used herein, an entity broadly refers to something that exists as itself, whether physically or abstractly. In certain embodiments, an entity may be an individual user, a group, an organization, or a government. In certain embodiments, an entity may likewise be an item, a device, such as endpoint and edge devices, a network, a domain, an operation, or a process. In certain embodiments, an entity may be a resource, such as a geographical location or formation, a physical facility, a venue, a system, a data store, or a service, such as a service operating in a cloud environment.

In certain embodiments, event stream enrichment operations 600 may be initiated by individual events in an event stream 602 being received and processed by various event enrichment modules to generate enriched events 610. As used herein, event enrichment broadly refers to performing certain data enrichment operations and processes associated with enriching data associated with a particular event in the event stream 602. As likewise used herein, data enrichment broadly refers to various operations and processes typically used to enhance, refine or otherwise improve raw data.

Examples of geographic data enrichment may include the use of postal code, county name, longitude and latitude, and political district data, while examples of behavioral data enrichment may include purchase, credit risk, and preferred communication channel data. Likewise, examples of demographic data enrichment may include the use of income, marital status, and education data, while examples of psychographic data enrichment may include interests and political affiliation data.

In certain embodiments, event enrichment may include matching certain incoming events in the event stream 602 with existing event data. In certain embodiments, event enrichment may include deleting certain data associated with certain incoming events in the event stream 602. For example, certain data associated with various incoming events may be determined to be irrelevant to analyzing the probability distributions of certain interrelated event features. In certain embodiments, the method by which data associated with various incoming events is determined to be irrelevant is a matter of design choice.

In certain embodiments, event enrichment may include correcting invalid data associated with certain incoming events in the event stream 602. In certain embodiments, event enrichment may include interpolating data associated with certain incoming events in the event stream 602 with existing event data. In certain embodiments, the existing event data may be stored in a repository of persistent event data.

For example, an event in the event stream 602 may be associated with a first user attaching a binary file to an email addressed to a second user. In this example, the event enrichment operations 600 may include determining the file type of the attachment. Likewise, the event enrichment operations 600 may include determining the size of the attachment, the date and time of the email, the address of the originating email server, the email addresses of the first and second user, and so forth. In certain embodiments, the event enrichment operations 600 may include associating annotations or other metadata corresponding to such determinations with the event.

In certain embodiments, the event enrichment modules may include an event validator module 604. In certain embodiments, the event validator 604 module may be implemented to perform data validation operations on data associated with a particular event. As used herein, data validation broadly refers to various operations and processes associated with data cleansing to ensure data quality. As likewise used herein, data cleansing broadly refers to the process of detecting, correcting, and possible removing, corrupted or inaccurate elements from a data set. In certain embodiments, data cleansing operations may include identifying incomplete, incorrect, inaccurate, or irrelevant data elements and then replacing, modifying or deleting certain data elements that fail to meet certain data use parameters.

In certain embodiments, the event validator 604 module may be implemented to perform data validation operations without the use of statistical data. In certain embodiments, the event validator 604 module may be implemented to validate event timestamps fall within a particular interval of time. In certain embodiments, the interval of time may be user-defined or otherwise configurable. In these embodiments, the definition of the interval of time is a matter of design choice. In certain embodiments, the event validator 604 module may be implemented such that an alias for an entity does not exceed a certain number of characters. In these embodiments, the number of characters is a matter of design choice. In certain embodiments, the event validator 604 module may be implemented that any attested metadata has an expected, corresponding type. In these embodiments, the expected type of metadata is a matter of design choice.

In certain embodiments, the resulting validated event data may be consistent with similar data sets used by a security analytics system to analyze the probability distribution of features associated with certain interrelated events. Certain embodiments of the invention reflect an appreciation that the intent of such data validation is to ensure fitness, accuracy and consistency of data associated with a particular event. Certain embodiments of the invention likewise reflect an appreciation that such fitness, accuracy and consistency is advantageous when performing operations associated with analyzing the probability distribution of features associated with certain interrelated events.

In certain embodiments, the event enrichment modules may include a de-duplication 606 module. In certain embodiments, the de-duplication 606 module may be implemented to perform operations associated with de-duplication, entity resolution, attachment enrichment, domain enrichment, or some combination thereof. As used herein, de-duplication operations broadly refer to operations for determining a unique identity for an event based upon certain identifying fields. In certain embodiments, the identifying fields may include an externally-generated concept, idea or notion provided by the data source from which the event originated. In various embodiments, the identifying fields may include certain fields deemed to be fundamental to the identity of an event, or identification thereof. In certain embodiments, the value of an identifying field may be taken as imprecise with configurable granularity. For example, events that appear to be similar, and have timestamps within one minute of one another, may be considered duplicates.

As likewise used herein, entity resolution operations broadly refer to operations for resolving certain raw identifiers in input data to known entities. In certain embodiments, the known entities may be used by a security analytics system for analyzing probability distributions of interrelated event features. Likewise, as used herein, attachment enrichment operations broadly refer to operations for adding metadata based upon the quantity or type of data associated with an event. In certain embodiments, the metadata may be determined by extension, mime type headers, or mime type, as inferred from content associated with an event. In certain embodiments, the metadata may be internal or external to an organization, a particular business unit, government agency, and so forth.

In certain embodiments, the event enrichment modules may likewise include a content isolation 606 module. In certain embodiments, the content isolation 606 module may be implemented to recognize and isolate certain types of recurring content. Examples of such recurring content may include standardized text, such as disclaimers or various types of boilerplate. Other examples of recurring content may include graphical images such as logos, icons, user avatars, and so forth. Certain embodiments of the invention reflect an appreciation that the inclusion of such recurring content in certain probability distribution analyses may result in an inaccurate representation of the probability distribution of features associated with a particular event. Accordingly, certain embodiments of the invention may not include content that has been isolated by the content isolation 606 module when performing various probability distribution analysis operations, described in greater detail herein.

Figure 7:
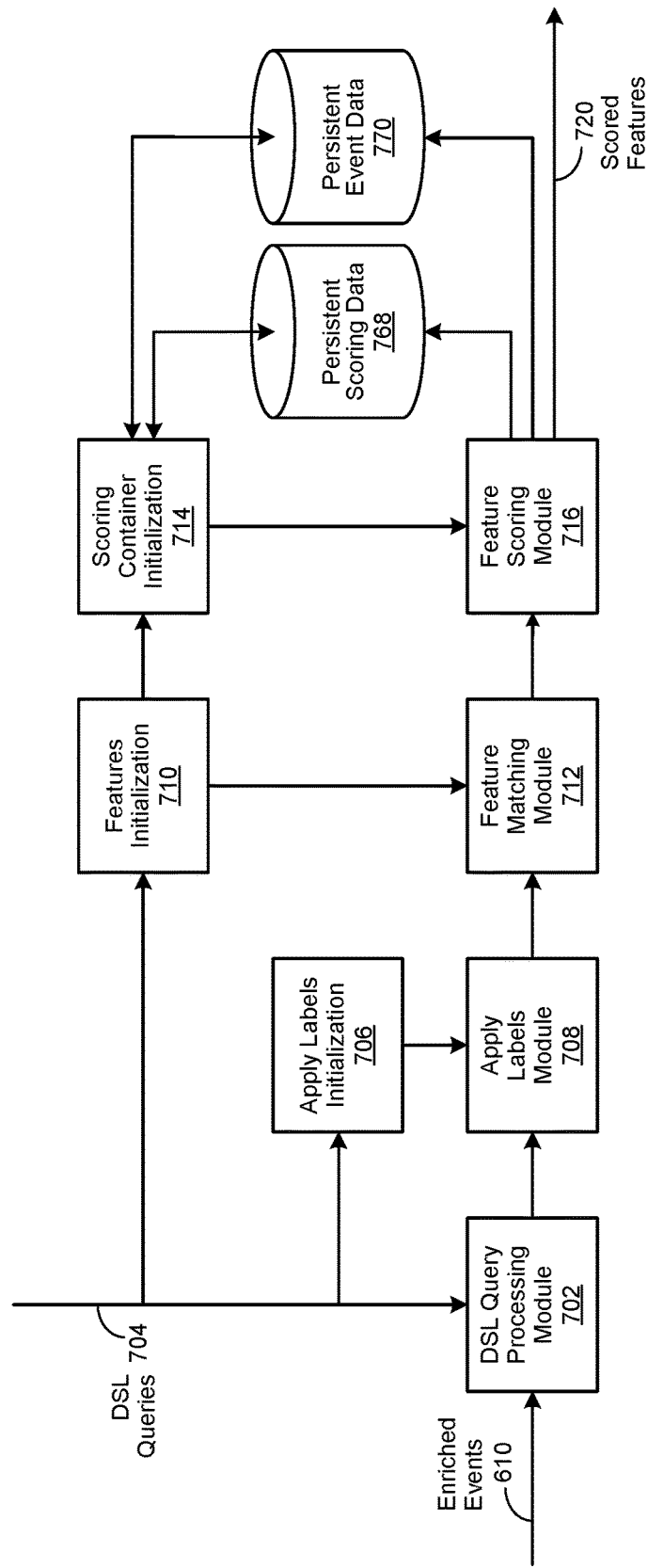
FIG. 7 is a generalized process flow diagram of the performance of event queue analytics operations.

FIG. 7 is a generalized process flow diagram of the performance of event queue analytics operations implemented in accordance with an embodiment of the invention. In various embodiments, a security analytics system may be implemented to process certain entity information associated with an event to analyze the probability distribution of its associated features. As used herein, entity information broadly refers to information that can be used to ascertain or corroborate the identity of an entity and its associated behavior, whether the behavior occurs within a physical realm or cyberspace. In certain embodiments, entity information may include user profile attributes, user behavior factors, or user mindset factors, described in greater detail herein. In various embodiments, entity information may include certain types of content. In certain embodiments, such content may include text, unstructured data, structured data, graphical images, photographs, audio recordings, video recordings, biometric information, and so forth. In certain embodiments, the entity information may include metadata. In certain embodiments, the metadata may include entity attributes, which in turn may include certain entity identifier types or classifications.

In various embodiments, the security analytics system may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In certain embodiments, the entity identifier information may include user authentication factors, user profile attributes, user behavior factors, user mindset factors, information associated with various endpoint and edge devices, networks, resources, or a combination thereof.

In certain embodiments, the entity identifier information may include temporal information. As used herein, temporal information broadly refers to a measure of time (e.g., a date, timestamp, etc.), a measure of an interval of time (e.g., a minute, hour, day, etc.), or a measure of an interval of time (e.g., between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device, accessing a system, and entering a physical facility. Other examples of temporal events include uploading, transferring, downloading, modifying, or deleting data, such as data stored in a datastore, or accessing a service. Yet other examples of temporal events include interactions between two or more users, interactions between a user and a device, interactions between a user and a network, and interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the security analytics system may be implemented to use information associated with such temporal resolution of an entity's identity to assess the risk associated with a particular entity, at a particular point in time, and adaptively respond with an associated response. In certain embodiments, the security analytics system may be implemented to respond to such assessments in order to reduce operational overhead and improve system efficiency while maintaining security integrity. In certain embodiments, the response to such assessments may be performed by a security administrator. Accordingly, certain embodiments of the invention may be directed towards assessing the risk associated with the affirmative resolution of the identity of an entity at a particular point in time in combination with its associated contextual information. Consequently, the security analytics system may be more oriented in various embodiments to risk adaptation than to security administration.

In certain embodiments, the security analytics system may be implemented to use various probability distributions to adaptively remediate multivariate risk, as described in greater detail herein. As used herein, a probability distribution broadly refers to a mathematical function that provides the probability of the occurrence of different possible outcomes within a sample space. A sample space, as likewise used herein, broadly refers to the set of all possible outcomes of a particular phenomenon being observed. In certain embodiments, the phenomenon being observed may be an event, described in greater detail herein. In certain embodiments, the phenomenon being observed is a matter of design choice.

In certain embodiments, the probability distribution is defined by a probability distribution function. In certain embodiments, the probability distribution function may be implemented as a probability density function, a probability mass function, or a cumulative distribution function. As likewise used herein, a probability density function (PDF), or density of a continuous random variable, broadly refers to a function whose value at any given sample within a particular sample space can be interpreted as providing a relative likelihood that the value of the random variable would equal that sample.

In certain embodiments, the sample may be the occurrence of a feature associated with a corresponding event. In certain embodiments, such a feature may be associated with anomalous, abnormal, unexpected or malicious user behavior, as described in greater detail herein. In certain embodiments, the occurrence of an unlikely feature associated with a particular entity may result in the generation of a corresponding risk score. In certain embodiments, the generation of a corresponding risk score may include computing the aggregation of occurrences of certain unlikely features with which an entity may be associated.

In certain embodiments, the resulting risk score may be assigned, or otherwise associated, with the entity associated with the occurrence of an unlikely feature. In certain embodiments, the assigned risk score may be implemented to reflect a security risk corresponding to the entity associated with the occurrence of the unlikely feature. In certain embodiments, multiple occurrences of an unlikely feature within a particular period of time may increase an assigned risk score.

A probability mass function (PMF), as used herein, broadly refers to a function that gives the probability that a discrete random variable is exactly equal to a particular value. A cumulative distribution function (CDF), as likewise used herein, broadly refers to a function whose value is the probability that a corresponding continuous random variable, described in greater detail herein, has a value less than or equal to the argument of the function.

In certain embodiments, one or more probability distribution functions may be implemented to describe the distribution of multivariate random variables. In certain embodiments, one or more probability distribution functions may be implemented to determine the relative unlikelihood that the value of a random variable would equal a particular sample. In certain embodiments, the relative unlikelihood that the value of a random variable would equal a particular sample may be classified as an outlier. In certain embodiments, the method by which a particular sample may be classified as an outlier is a matter of design choice. As an example, a particular sample that is more than two standard deviations from the mean of a PDF distribution may be considered to be an outlier. Likewise, a particular sample that is more than one standard deviation from the mean of a PDF distribution may be considered to be an outlier.

In certain embodiments, the sample may be the occurrence of a feature associated with a corresponding event. As used herein, a feature, as it relates to an event, broadly refers to a property, characteristic or attribute of a particular event. As an example, features associated with a corpus of thousands of text-oriented messages (e.g., SMS, email, social network messages, etc.) may be generated by removing low-value words (i.e., stopwords), using certain size blocks of words (i.e., n-grams), or applying various text processing rules. Examples of features associated with an event may include the number of bytes uploaded, the time of day, the presence of certain terms in unstructured content, the respective domains associated with senders and recipients of information, and the Uniform Resource Locator (URL) classification of certain web page visits. Examples of other features associated with an event may include data associated with various risk-adaptive behavior factors, described in greater detail herein.

In certain embodiments, such features may be associated with anomalous, abnormal, unexpected or malicious user behavior, as described in greater detail herein. In certain embodiments, the occurrence of an unlikely feature or features associated with a particular entity may result in the generation of a corresponding risk score. In certain embodiments, the generation of a corresponding risk score may include computing the aggregation of occurrences of certain unlikely features with which an entity may be associated. In certain embodiments, the resulting risk score may be assigned, or otherwise associated, with the entity associated with the occurrence of an unlikely feature. In certain embodiments, the assigned risk score may be implemented to reflect a security risk corresponding to the entity associated with the occurrence of the unlikely feature. In certain embodiments, multiple occurrences of an unlikely feature within a particular period of time may increase an assigned risk score.

In certain embodiments, the event queue analytics operations may be implemented to determine whether or not a particular document matches a set of queries 704 defined in a Domain Specific Language (DSL). In certain embodiments, the DSL query 704 may reference data, metadata, or a combination thereof, related to an event. In certain embodiments, the DSL query 704 may be expressed in a DSL specific to the domain of temporal events involving the data, metadata, or a combination related to such events. As used herein, a document broadly refers to a body of content. In certain embodiments, such content may include text, unstructured data, structured data, graphical images, photographs, audio recordings, video recordings, biometric information, metadata, and so forth. As likewise used herein, a Domain Specific Language (DSL) broadly refers to a computer language specialized to a particular application domain. Examples of DSLs include Hypertext Mark-up Language (HTML) for web pages. Mathematica® for symbolic mathematics, Structured Query Language (SQL) for relational database queries, and Query DSL (QDSL) for Elasticsearch queries.

Referring now to FIG. 7, enriched events 610 resulting from performance of the event enrichment operations 600 described in the text associated with FIG. 6 may be provided in certain embodiments to a DSL query processing 702 module. In certain embodiments, the DSL query processing 702 module may be implemented to provide a streaming query framework. In certain embodiments, the streaming query framework may be implemented to extract features, as described in greater detail herein, and construct probability distributions in real-time, in batch mode, or on-demand. In certain embodiments, the DSL query processing 702 module may be implemented to receive certain DSL queries 704 that include terms, features, tags, or other items of interest that may be associated with certain interrelated events. As used herein, a term broadly refers to a word, compound word, phrase expression, numeric value, or alphanumeric string, which in certain contexts is associated with a particular meaning. As used herein, a phrase broadly refers to a sequence of terms, or multi-words, familiar to skilled practitioners of the art. In certain embodiments, a term may be associated with an event, a feature of an event, a classification label, a metadata tag label, or a combination thereof.

In certain embodiments, the DSL query processing 702 module may be implemented to determine the commonalities between such DSL queries 704. In certain embodiments, the DSL query processing 702 module may be implemented to lazily evaluate such features, terms, or phrases of interest, as described in greater detail herein. In certain embodiments, as likewise described in greater detail herein, the DSL query processing 702 module may be implemented only evaluate the features or other terms of interest needed for the evaluation of a particular event. In certain embodiments, the DSL query processing 702 module may be implemented to only evaluate the features or other terms of interest once when performing multiple DSL queries 704.

In certain embodiments, the DSL queries 704 may only be processed when the DSL query processing 702 module is first initialized. In certain embodiments the queries 704 may be reprocessed periodically by the DSL query processing 702 module during event collection if they have been added to or otherwise changed. In certain embodiments, such reprocessing may be performed by periodically polling for configuration changes and reinitializing the DSL query processing 702 module as needed. Certain embodiments of the invention reflect an appreciation that such reinitializing of the DSL query processing 702 module facilitates the reduction of a DSL query 704, which involves executing preliminary query steps against reference data. In certain embodiments, the reference data may be stored in a secondary repository (not shown), which cross-references the event data using identifiers searchable within a repository of persistent event data 770.

As an example, a DSL query 704 may be for events associated with employees whose salary is greater than some amount. In this example, the first step is to identify who those employees may be, and once they are identified, include them into the query when it is "reduced." It will be appreciated that the use of cached results in place of taking this step may result in missing an employee who recently received a raise, and as a result, belongs in the group of identified employees. It will likewise be appreciated that inclusion in the group of identified employees would typically not occur until the DSL query processing 702 module was reinitialized. In certain embodiments, the DSL query processing 702 module may be implemented to periodically recompile and re-reduce certain DSL queries 704. In these embodiments, the method by which the decision is made to periodically recompile and re-reduce DSL queries 704 is a matter of design choice.

In certain embodiments, the receipt of a DSL query 704 may result in certain apply labels initialization 706 operations being performed to initialize an apply labels 708 module. In certain embodiments, the apply labels 708 module may be implemented to classify events received from the DSL query processing 702 module by labeling them with associated classification labels. In certain embodiments, the labels applied by the apply labels 708 module may include associated metadata tags. In these embodiments, the method by which the apply labels 708 module selects a classification or metadata tag label, and the associated nomenclature thereof, is a matter of design choice.

As an example, an event may include a user downloading a file from a particular server address. In this example, the event may be classified as a "file download" with corresponding metadata of "server address." Accordingly, the apply labels 614 module may apply both a "file download" classification label and a "server address" metadata tag label to the event. As another example, an event may include an employee using a badge to enter a secured facility after normal work hours. In this example, the event may be classified as "facility access," with corresponding metadata of "secure" and "after hours." Accordingly, the apply labels 708 module may apply a "facility access" classification label as well as "secure" and "after hours" metadata tag labels to the event.

In certain embodiments, the labels applied by the apply labels 708 module may be user-generated, user-edited, or a combination thereof. In various embodiments, certain labels applied by the apply labels 708 module may be applied automatically, corresponding to certain sets of conditions. In certain embodiments, the labels applied by the apply labels 708 module may be automatically or manually removed from certain interrelated events, based on inspection. In certain embodiments, the labels applied by the apply labels 708 module to one event may automatically or manually be added to another event. In certain embodiments, such addition of labels may be based upon a query to provide bulk labeling of certain interrelated events that may share common features or other characteristics. In various embodiments, such addition of labels may be implemented to flag certain interrelated events as part of a review workflow. In certain embodiments, the apply labels operations performed by the apply labels 708 module may result in configured features.

In certain embodiments, the receipt of a DSL query 704 may result in certain features initialization 710 operations being performed to initialize a feature matching 712 module. In certain embodiments, configured events generated by the apply labels 708 module may be processed by the feature matching 712 module to generate matched features. In certain embodiments, the feature matching 712 module may be implemented to perform certain feature extraction operations on the configured featured generated by the apply labels 708 module.

As likewise used herein, feature extraction broadly refers to the selection of a subset of features associated with an event. In certain embodiments, the feature matching 712 module may be implemented to perform transformation operations on a group of features associated with an event to generate a smaller set of derived features. In certain embodiments, the feature matching 714 module may be implemented to construct derived probabilistic models based upon a particular group of features. In certain embodiments, certain features may be aggregated, from which the derived probabilistic models may be constructed. In certain embodiments, the resulting derived probabilistic models may be aggregated into a scenario. As used herein, a scenario is broadly defined as a group of derived probabilistic models associated with a corresponding group of interrelated events.

Certain embodiments of the invention reflect an appreciation that the generation of derived features may be advantageous as various features associated with a particular event may represent a non-linear pattern or relationship. Likewise, having too many features that may share similar attributes may result in multicollinearity or otherwise confound certain statistical models. Accordingly, the performance of certain feature extraction operations to extract a minimal number of derived features may result in more accurately determining the probability distribution of associated features corresponding to a particular event. In certain embodiments, the feature matching 712 module may be implemented to use certain scoring data stored in a repository of persistent scoring data 768, or event data stored in a repository of persistent event data 770, or a combination thereof, to perform the feature extraction operations.

In certain embodiments, scoring container update operations, described in greater detail herein, may be initiated by the performance of certain scoring container initialization 714 operations to initialize a feature scoring 716 module. In certain embodiments, the scoring container initialization 714 operations may be initiated by the performance of certain features initialization 710 operations. In certain embodiments, the scoring container initialization 712 module may be implemented to determine whether feature matching operations, likewise described in greater detail herein, should be performed on a particular configured feature.

In certain embodiments, the determination of whether or not feature matching operations are performed may be dependent upon on the type of the feature. In certain embodiments, the type of the feature may be determined by an associated feature definition. In these embodiments, the method by which a feature definition is defined, determined, or associated with a corresponding feature is a matter of design choice.

In certain embodiments, events are not inspected prior to initializing a scoring container. In certain embodiments, a repository of persistent event data 770 may be queried for a random sampling of events containing particular configured features. In certain embodiments, the resulting random sampling of events may be used during various scoring container initialization 714 operations to generate an initial probability distribution of their associated features. In certain embodiments, the initial probability distribution of associated features may likewise be stored in the repository of persistent event data 770 for re-use.

If so, then feature matching operations, described in greater detail herein, are performed on the extracted feature by a feature matching 712 module. If not, or once the feature matching operations are performed by the feature matching 712 module, scoring operations, likewise described in greater detail herein, are performed on the configured feature by a feature scoring 716 module. In certain embodiments, performance of certain feature scoring operations by the feature scoring 706 module results in the generation of scored features 720. In certain embodiments, the scored features may be stored in the repository of persistent event data 770.

Figure 8A:
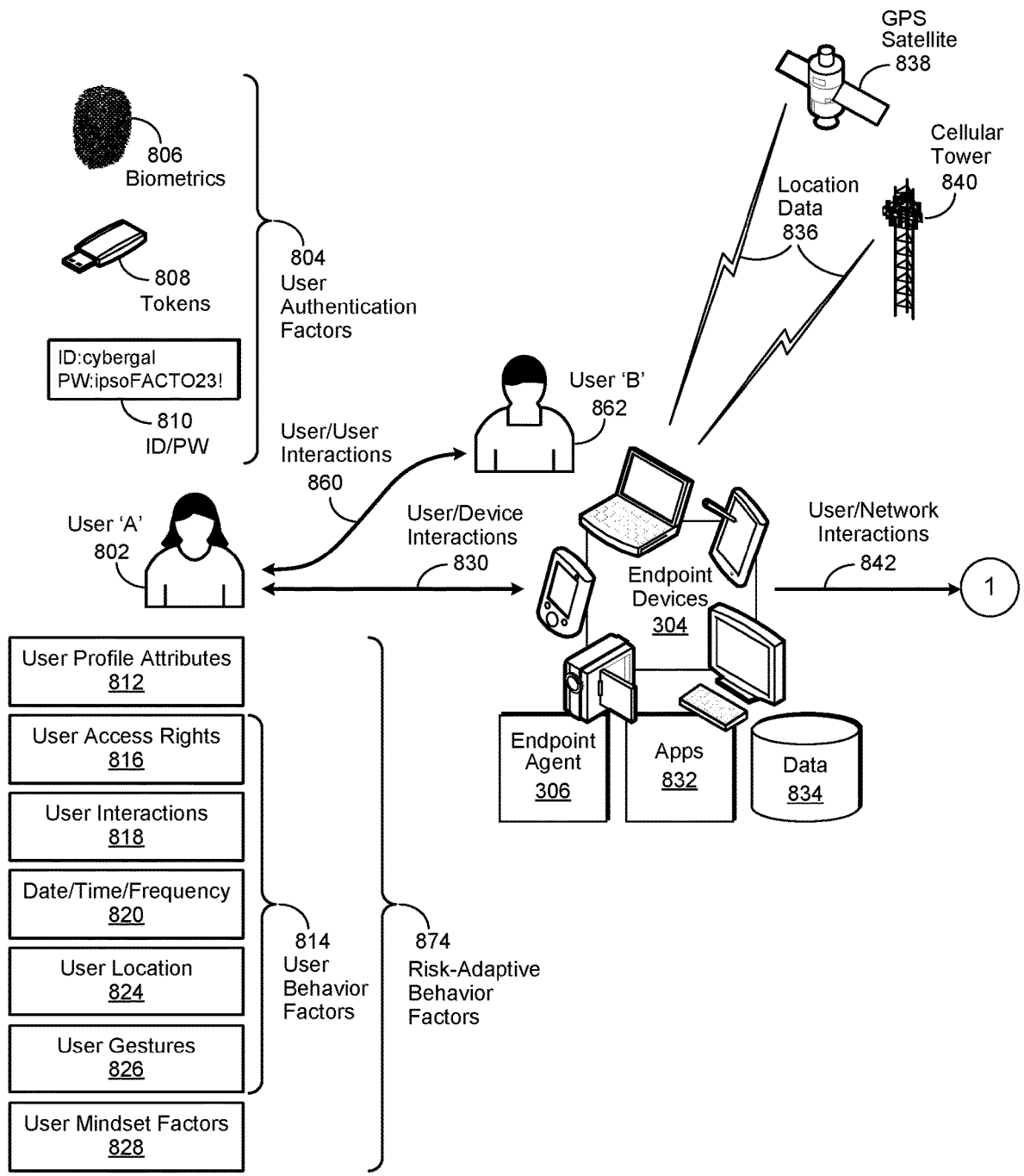
FIGS. 8a and 8b are a simplified block diagram of the operation of a security analytics system.
Figure 8B:
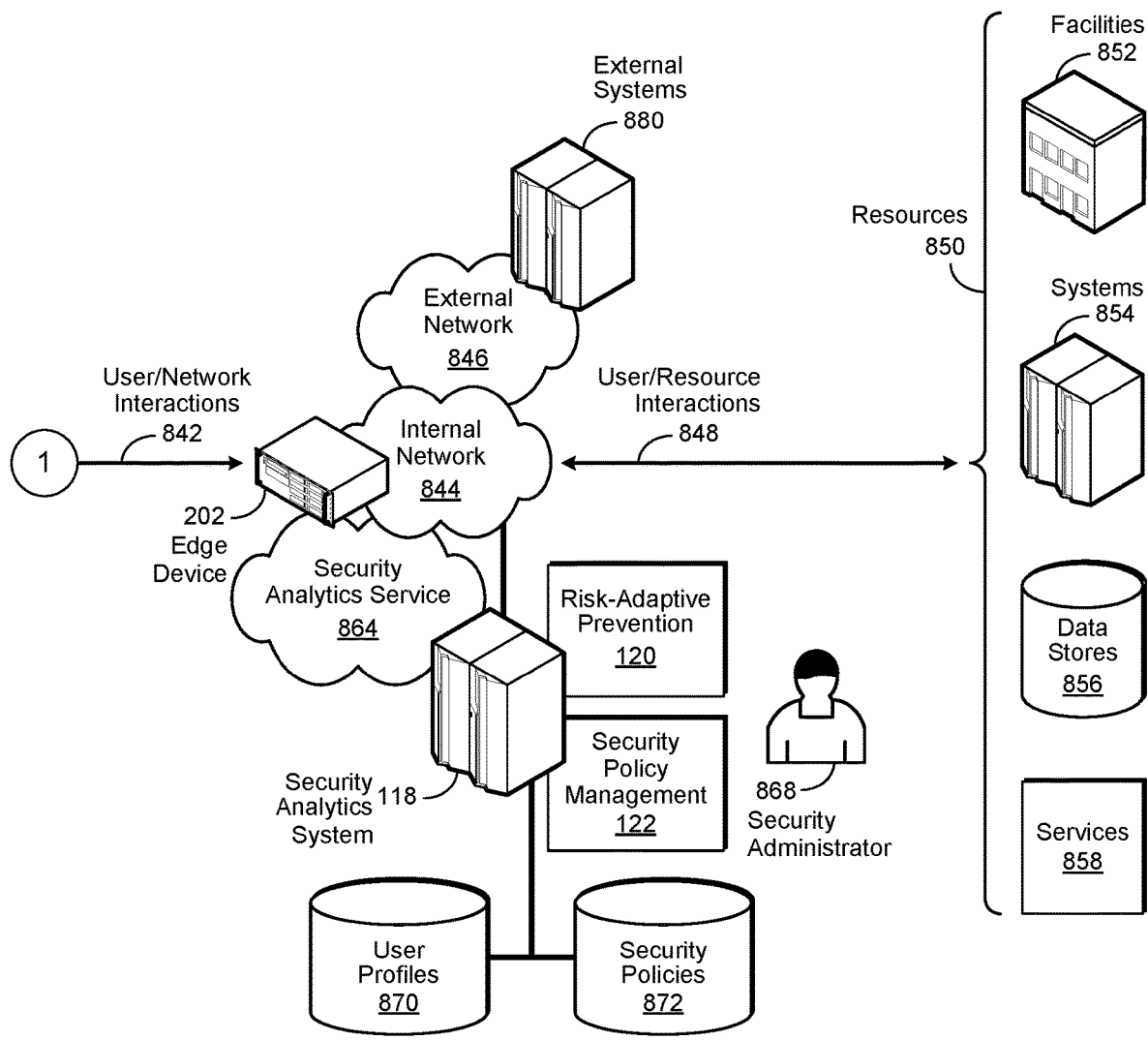

FIGS. 8a and 8b are a simplified block diagram of the operation of a security analytics system implemented in accordance with an embodiment of the invention. In certain embodiments, analyses performed by the security analytics system 118 may be used to identify anomalous, abnormal, unexpected or malicious behavior associated with a user. In certain embodiments, the anomalous, abnormal, unexpected or malicious behavior may be identified at a particular point in time, during the occurrence of an event, the enactment of a user behavior, or a combination thereof.

In certain embodiments, information associated with such user behavior may be stored in a user profile. As used herein, a user profile broadly refers to a collection of information that uniquely describes a user's identity and their associated behavior, whether the behavior occurs within a physical realm or cyberspace. In certain embodiments, the user profile may be stored in a repository of user profiles 870. In certain embodiments, as described in greater detail herein, the user profile may include user profile attributes 812, user behavior factors 814, user mindset factors 828, or a combination thereof.

In certain embodiments, the security analytics system 118 may be implemented with a risk-adaptive protection 120 module, a security policy management 122 module, or a combination thereof. In certain embodiments, the risk-adaptive protection 120 module may be implemented to perform various risk-adaptive operations, described in greater detail herein. In certain embodiments, various risk-adaptive behavior factors 874, likewise described in greater detail herein, may be used to perform the risk-adaptive protection operations. In certain embodiments, the risk-adaptive behavior factors 874 may include user profile attributes 812, user behavior factors 814, user mindset factors 828, or a combination thereof. In these embodiments, the risk-adaptive behavior factors 874 used to perform the risk-adaptive protection operations is a matter of design choice.

As used herein, a user profile attribute 812 broadly refers to data or metadata that can be used, individually or in combination with other user profile attributes 812, to uniquely ascertain the identity of a user. In certain embodiments, the user profile attributes 812 may include certain personal information. In certain embodiments, the personal information may include non-sensitive personal information associated with a user, such as their name, title, position, role, and responsibilities. In certain embodiments, the personal information may likewise include technical skill level information, peer information, expense account information, paid time off (PTO) information, data analysis information, insider information, misconfiguration information, third party information, or a combination thereof.

In certain embodiments, the personal information may contain sensitive personal information associated with a user. As used herein, sensitive personal information (SPI), also commonly referred to as personally identifiable information (PII), broadly refers to any information usable to ascertain the identity of a user, either by itself, or in combination with other information, such as contextual information described in greater detail herein. Examples of SPI may include the full or legal name of a user, initials or nicknames, place and date of birth, home and business addresses, personal and business telephone numbers, their gender, and other genetic information.

Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 804, such as biometrics 806, tokens 808, user identifiers and passwords 810, and personal identification numbers (PINs).

In certain embodiments, the user authentication factors 804 may be used to authenticate the identity of a user, such as user 'A' 802 or 'B' 862. In certain embodiments, the user authentication factors 806 may be used to ensure that a particular user, such as user 'A' 802 or 'B' 862, is associated with their corresponding user profile, rather than a user profile associated with another user. In certain embodiments, the user authentication factors 804 may include a user's biometrics 806, an associated security token 808, (e.g., a dongle containing cryptographic keys), or a user identifier/password (ID/PW) 810.

In certain embodiments, the user authentication factors 804 may be used in combination to perform multi-factor authentication of a user, such as user 'A' 802 or 'B' 862. As used herein, multi-factor authentication broadly refers to approaches requiring two or more authentication factors. In general, multi-factor authentication includes three classes of user authentication factors 804. The first is something the user knows, such as a user ID/PW 810. The second is something the user possesses, such as a security token 808. The third is something that is inherent to the user, such as a biometric 806.

In certain embodiments, multi-factor authentication may be extended to include a fourth class of factors, which includes one or more user behavior factors 814, or portions thereof. In these embodiments, the fourth class of factors may include user behavior the user has previously enacted, is currently enacting, or is expected to enact at some point in the future. In certain embodiments, the enactment of a user behavior may be associated with a particular event. In certain embodiments, multi-factor authentication may be performed on recurring basis. In various embodiments, the multi-factor authentication may be performed at certain time intervals during the enactment of a particular user behavior. In certain embodiments, the time interval may be uniform. In certain embodiments, the time interval may vary or be random.

In certain embodiments, the multi-factor authentication may be performed according to the occurrence of an event or the enactment of a particular user behavior, such as accessing a resource 850. In various embodiments, certain combinations of the multi-factor authentication described herein may be used according to the enactment of a particular user behavior. From the foregoing, those of skill in the art will recognize that the addition of such a fourth class of factors not only strengthens current multi-factor authentication approaches, but further, allows the factors to be more uniquely associated with a given user and their corresponding user profile.

Those of skill in the art will be aware that it is not uncommon for hackers, criminals and other actors to use various SPI to impersonate a user in order to gain unauthorized access to various systems, data, or facilities. It is likewise not uncommon for such individuals to masquerade as a user in order to collect their associated SPI for the purpose of identity theft. One known approach to gathering a user's SPI is to illicitly capture a data stream, such as a flow of network packets that include SPI sent by a user to another machine, such as an external system 880. Defenses against such approaches include encrypting the data stream prior to its communication across a network, such as the internal 844 or external 846 networks shown in FIG. 8.

However, other approaches, such as the use of a key logger, may surreptitiously capture the user's keystrokes or user gestures 826, described in greater detail herein, and communicate the resulting data stream in their native form to a hacker or other infiltrator. Another issue is the possibility that a normally-trusted insider, such as a security administrator 868, may have access to a decrypted data stream as part of their day-to-day responsibilities. As an example, a security administrator 868 may be using a security analytics 400 system to perform threat analysis related to a particular user. In the process, they may be exposed to various SPI associated with the user, such as certain user IDs and passwords 810. It will be appreciated that such exposure creates the opportunity for a security breach, whether intended or not. Another approach is to impersonate a legitimate website. In such approaches, the user may navigate to the site and innocently enter their ID/password 810, only to have them captured for later use in illegal activities.

As used herein, a user behavior factor 814 broadly refers to information associated with a user's behavior, whether the behavior occurs within a physical realm or cyberspace. In certain embodiments, user behavior factors 814 may include the user's access rights 816, the user's interactions 818, and the date/time/frequency 820 of when the interactions 818 are enacted. In certain embodiments, the user interactions 818 may include user/device 830, user/network 842, user/resource 848, user/user 860 interactions, or some combination thereof. In certain embodiments, the user/device 830 interactions may include an interaction between a user, such as user 'A' 602 or 'B' 662, and an endpoint device 304. In certain embodiments, the user behavior factors 814 may likewise include the user's location 824, and the gestures 826 used to enact the interactions 818.

In certain embodiments, the user gestures 826 may include key strokes on a keypad, a cursor movement, a mouse movement or click, a finger swipe, tap, or other hand gesture, an eye movement, or some combination thereof. In certain embodiments, the user gestures 826 may likewise include the cadence of the user's keystrokes, the motion, force and duration of a hand or finger gesture, the rapidity and direction of various eye movements, or some combination thereof. In certain embodiments, the user gestures 826 may include various audio or verbal commands performed by the user.

In various embodiments, certain date/time/frequency 820 user behavior factors 814 may be implemented as ontological or societal time, or a combination thereof. As used herein, ontological time broadly refers to how one instant in time relates to another in a chronological sense. As an example, a first user behavior enacted at 12:00 noon on May 17, 2017 has occurred prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 812, user behavior factors 814, user mindset factors 828, or a combination thereof, to one or more instants in time. As an example, user 'A' 802 may access a system 854 to download a customer list at 3:47 PM on Nov. 3, 2017. Analysis of their user behavior profile indicates that it is not unusual for user 'A' 802 to download the customer list on a weekly basis. However, examination of their user behavior profile also indicates that user 'A' 802 forwarded the downloaded customer list in an email message to user 'B' 862 at 3:49 PM that same day. Furthermore, there is no record in their user behavior profile that user 'A' 802 has ever communicated with user 'B' 862 in the past. Moreover, it may be determined that user 'B' 862 is employed by a competitor. Accordingly, the correlation of user 'A' 802 downloading the customer list at one point in time, and then forwarding the customer list to user 'B' 862 at a second point in time shortly thereafter, is an example of societal time.

In a variation of the prior example, user 'A' 802 may download the customer list at 3:47 PM on Nov. 3, 2017. However, instead of immediately forwarding the customer list to user 'B' 862, user 'A' 802 leaves for a two week vacation. Upon their return, they forward the previously-downloaded customer list to user 'B' 862 at 9:14 AM on Nov. 20, 2017. From an ontological time perspective, it has been two weeks since user 'A' 802 accessed a system 854 to download the customer list. However, from a societal time perspective, they have still forwarded the customer list to user 'B' 862, despite two weeks having elapsed since the customer list was originally downloaded.

Accordingly, the correlation of user 'A' 802 downloading the customer list at one point in time, and then forwarding the customer list to user 'B' 862 at a much later point in time, is another example of societal time. More particularly, it may be inferred that the intent of user 'A' 802 did not changed during the two weeks they were on vacation. Furthermore, user 'A' 802 may have attempted to mask an intended malicious act by letting some period of time elapse between the time they originally downloaded the customer list and when they eventually forwarded it to user 'B' 862. From the foregoing, those of skill in the art will recognize that the use of societal time may be advantageous in determining whether a particular user behavior is acceptable, anomalous, abnormal, unexpected or malicious.

As used herein, mindset factors 828 broadly refer to information used to determine the mental state of a user at a particular point in time, during the occurrence of an event or an enactment of a user behavior, or combination thereof. As used herein, mental state broadly refers to a hypothetical state corresponding to the way a user may be thinking or feeling. In certain embodiments, the user mindset factors 828 may include a personality type. Examples of known approaches for determining a personality type 624 include Jungian types, Myers-Briggs type indicators, Keirsy Temperament Sorter, Socionics, Enneagram of Personality, and Eyseneck's three-factor model.

In certain embodiments, the mindset factors 828 may include various behavioral biometrics. As likewise used herein, a behavioral biometric broadly refers to a physiological indication of a user's mental state. Examples of behavioral biometrics may include a user's blood pressure, heartrate, respiratory rate, eye movements and iris dilation, facial expressions, body language, tone and pitch of voice, speech patterns, and so forth.

Certain embodiments of the invention reflect an appreciation that certain user behavior factors 814, such as user gestures 826, may provide additional information related to determining a user's mental state. As an example, a user entering text at a quick pace with a rhythmic cadence may indicate intense focus. Likewise a user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user gestures 826 may indicate the mental state of a user, they may not provide the reason for the user to be in a particular mental state. Likewise, certain embodiments of the invention include an appreciation that certain user gestures 826 and behavioral biometrics are reflective of a user's personality type. As an example, aggressive, forceful keystrokes combined with an increased heart rate may indicate normal behavior for a particular user when composing end-of-month performance reviews. In various embodiments, certain user behavior factors 814, such as user gestures 826, may be correlated with certain contextual information.

As used herein, contextual information broadly refers to any information, directly or indirectly, individually or in combination, related to a particular user behavior. In certain embodiments, user behavior may include a user's physical behavior, cyber behavior, or a combination thereof. As likewise used herein, a user's physical behavior broadly refers to any user behavior occurring within a physical realm, such as speaking, gesturing, facial patterns or expressions, walking, and so forth. More particularly, such physical behavior may include any action enacted by a user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be observed through the use of an electronic device (e.g., an electronic sensor), a computing device or system (e.g., an endpoint device 304), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

As likewise used herein, cyberspace broadly refers to a network environment, such as an internal 844 or external 846 network, capable of supporting communication between two or more entities. In certain embodiments, the entity may be a user, an endpoint device 304, or various resources, described in greater detail herein. In certain embodiments, the entities may include various endpoint devices 304 or resources 850 operating at the behest of an entity, such as a user. In certain embodiments, the communication between the entities may include audio, image, video, text, or binary data.

In certain embodiments, the contextual information may include a user's authentication factors 804. In certain embodiments, contextual information may likewise include various user identity resolution factors, such as personal information associated with the user, the date/time/frequency 820 of various user behavior, the user's location 824, the user's role or position in an organization, their associated access rights 816, and certain user gestures 826 employed by the user in the enactment of a user behavior. Other contextual information may likewise include various user interactions, whether the interactions are with an endpoint device 304, a network 140, a resource 850, or another user. In certain embodiments, user behaviors, and their related contextual information, may be collected at particular points of observation, and at particular points in time, described in greater detail herein.

In certain embodiments, a user profile may be processed with associated contextual information to generate correlated contextual information. In certain embodiments, the correlated contextual information, along with a user's user profile, may be used to perform certain user behavior analysis. In certain embodiments, the user behavior analysis may be performed by the security analytics system 118. In certain embodiments, the security analytics system 118 may be implemented to process a user profile and certain correlated contextual information associated with a user to determine their mental state at a particular point in time. In certain embodiments, the mental state of a user at a particular point in time may be used in combination with various user profile attributes 812 and user behavior factors 814, in the context of an associated user state, to infer a user's intent.

In certain embodiments, a user profile may be used with a first set of contextual information to determine the user's mental state at a first point in time and a second set of contextual information to determine their mental state at a second point in time. In certain embodiments, the user's mental state at a first point in time may correspond to the occurrence of a first user event and the user's mental state at a second point in time may correspond to the occurrence of a second user event. Certain embodiments of the invention reflect an appreciation that such a first and second set of contextual information may be decidedly different, which may provide context for the user's mental state at different times and during the occurrence of different user events. Likewise, the first and second set of contextual information may be substantively the same, which may provide an indication that while the user's mental state may be different at two points in time, or during the occurrence of two different user events, the cause of their mental state may not be related to the contextual information that was collected at the two points in time.

It will be appreciated that over time, the user behavior of a particular user, such as user 'A' 802, will be uniquely different and distinct from another user, such as user 'B' 862. Accordingly, user profile '1' will uniquely reflect the user behavior of user '1', just as user profile 'n' will uniquely reflect the user behavior of user 'n'. As an example, user 'A' 802 may have a user profile attribute 812 of sales administrator. Upon arriving at their office in the morning, the user consistently checks their email, item by item, responding to each in turn, followed by processing expense reports for field sales personnel. Then, after lunch, the user may access and review sales forecasts on an internal system 854. Furthermore, the user may exhibit sporadic keyboard entry interspersed with extensive mouse activity, or user gestures 826, when perusing the sales forecasts.

Moreover, personality type information associated with user 'A' 802 may indicate the user consistently exhibits a positive, outgoing attitude. In this example, the sequence of the activities enacted by user 'A' 802 throughout the day, and their frequency, correspond to their expected date/time/frequency 820 user behavior factors 814. Likewise, the keyboard cadence and other user gestures 826 are examples of granular user behavior factors 814, while the personality type information is an example of an abstract user behavior factor 814.

As another example, user 'B' 862 may have a user profile attribute 812 of financial controller. Upon arriving at their office in the morning, the user usually scans their email messages, responding only to those that are urgent. Then they check the daily budget status of each department to see whether they are conforming to their respective guidelines. After lunch, the user may follow up on emails that are less urgent, followed by updating the organization's financials, likewise on an internal system 854. Additionally, user 'B' 862 may exhibit deliberate keyboard entry interspersed with iterative mouse activity, or user gestures 826, when updating financial information. Moreover, personality type information associated with user 'B' 862 may indicate they consistently exhibit a reserved, introspective and contemplative attitude. As in the prior example, the sequence of the activities enacted by user 'B' 862 throughout the day, and their frequency, correspond to their expected date/time/frequency 820 user behavior factors 814. Likewise, as before, the keyboard cadence and other user gestures 826 are examples of granular user behavior factors 814, while the personality type information is an example of an abstract user behavior factor 814.

It will likewise be appreciated that the user behavior of a particular user may evolve over time. As an example, certain user behavior exhibited by a user during the first month of assuming a new position within an organization may be quite different than the user behavior exhibited after being in the position for six months. To continue the example, the user may be somewhat tentative when learning to access and interact with unfamiliar resources 850 in the first month in the position, but by the sixth month, such access and interaction is commonplace and routine.

In certain embodiments, a user behavior factor 814 associated with a particular user, such as user 'A' 802 or 'B' 862, may be used by the security analytics system 118 to compare the user's current user behavior to past user behavior. If the user's current user behavior matches their past user behavior, then the security analytics system 118 may determine that the user's user behavior is acceptable. If not, then the user profile management system 118 may determine that the user's user behavior is anomalous, abnormal, unexpected or malicious.

However, as described in greater detail herein, a change in a particular user's user behavior over time may not be anomalous, abnormal, unexpected, or malicious. Instead, it may be acceptable behavior that simply evolves over time as a natural result of day-to-day user/device 830, user/network 842, user/resource 848, or user/user 860 interactions. In certain embodiments, the security analytics system 118 may be implemented to determine whether such changes in a user's user behavior over time are acceptable, anomalous, abnormal, unexpected or malicious. In certain embodiments, a user behavior profile may be implemented in combination with the security analytics system 118 to make this temporal determination.

It will be appreciated that anomalous, abnormal, unexpected or malicious user behavior may include inadvertent or compromised user behavior. For example, the user may have innocently miss-entered a request for data that is proprietary to an organization. As another example, the user may be attempting to access confidential information as a result of being compromised. As yet another example, a user may attempt to access certain proprietary data from their home, over a weekend, and late at night. In this example, the user may be working from home on a project with an impending deadline. Accordingly, the attempt to access the proprietary data is legitimate, yet still anomalous, abnormal or unexpected as the attempt did not occur during the week, from the user's place of employment, during normal work hours. However, the user behavior may manifest in context with consistent remote access patterns and provide sufficient evidence to determine the nature of the activity.

Likewise, the security analytics system 118 may determine that the user's user behavior to be malicious. As yet another example, an impostor may be attempting to pose as a legitimate user in an attempt to exploit one or more resources 850. In this example, the attempt to exploit one or more resources 850 is malicious user behavior. As yet still another example, a legitimate user may be attempting to increase their level of access to one or more resources 850. In this example, the user's attempt to increase their level of access may indicate malicious user behavior.

To further extend these examples, such resources 850 may include various facilities 852, systems 854, data stores 856, or services 858. In certain embodiments, the security analytics system 118 may be implemented to block a user if it is determined their user behavior is anomalous, abnormal, unexpected or malicious. In certain embodiments, the security analytics system 118 may be implemented to modify a request submitted by a user if it is determined the request is anomalous, abnormal, unexpected or malicious. In certain embodiments, the security analytics system 118 may be implemented to modify an outcome. For example, the security analytics system 118 may encrypt a file when a copy operation or request is detected.

In certain embodiments, the user profile may be implemented as a cyberprofile. A cyberprofile, as used herein, broadly refers to a collection of information that uniquely describes an entity and their associated behavior within cyberspace. In certain embodiments, the security analytics system 118 may be implemented to use information associated with certain user behavior elements to define and manage a user profile. A user behavior element, as used herein, broadly refers to a discrete element of a user's behavior during the performance of a particular operation, or the occurrence of a particular event, in a physical realm, cyberspace, or a combination thereof. In certain embodiments, such user behavior elements may be associated with a user/device 830, a user/network 842, a user/resource 848, a user/user 860 interaction, or combination thereof.

As an example, user 'A' 802 may use an endpoint device 304 to browse a particular web page on a news site on the Internet. In this example, the individual actions performed by user 'A' 802 to access the web page are user behavior elements that constitute a user behavior. As another example, user 'A' 802 may use an endpoint device 304 to download a data file from a particular system 854. In this example, the individual actions performed by user 'A' 802 to download the data file, including the use of one or more user authentication factors 804 for user authentication, are user behavior elements that constitute a user behavior. In certain embodiments, the user/device 830 interactions may include an interaction between a user, such as user 'A' 802 or 'B' 862, and an endpoint device 304.

In certain embodiments, the user/device 830 interaction may include interaction with an endpoint device 304 that is not connected to a network at the time the interaction occurs. As an example, user 'A' 802 or 'B' 862 may interact with an endpoint device 304 that is offline, using applications 832, accessing data 834, or a combination thereof, it may contain. Those user/device 830 interactions, or their result, may be stored on the endpoint device 304 and then be accessed or retrieved at a later time once the endpoint device 304 is connected to the internal 844 or external 846 networks.

In certain embodiments, the endpoint device 304 may be used to communicate data through the use of an internal network 844, an external network 846, or a combination thereof. In certain embodiments, the internal 844 and the external 846 networks may include a public network, such as the Internet, a physical private network, a virtual private network (VPN), or any combination thereof. In certain embodiments, the internal 844 and external 846 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/resource 848 interactions may include interactions with various resources 850. In certain embodiments, the resources 850 may include various facilities 852 and systems 854, either of which may be physical or virtual, as well as data stores 856 and services 858. In certain embodiments, the user/user 860 interactions may include interactions between two or more users, such as user 'A' 802 and 'B' 862. In certain embodiments, the user/user interactions 860 may be physical, such as a face-to-face meeting, via a user/device 830 interaction, a user/network 842 interaction, a user/resource 848 interaction, or some combination thereof.

In certain embodiments, the user/user 860 interaction may include a face-to-face verbal exchange between two users. In certain embodiments, the user/user 860 interaction may include a written exchange, such as text written on a sheet of paper, between two users. In certain embodiments, the user/user 860 interaction may include a face-to-face exchange of gestures, such as a sign language exchange, between two users. In certain embodiments, temporal event information associated with various interactions 830, 842, 848, 860 may be collected and used to define and manage a user profile.

In certain embodiments, the security analytics system 118 may be implemented to observe user behavior at one or more points of observation within a physical domain or cyberspace environment. In certain embodiments, the points of observation may occur during various user interactions, such as user/device 830, user/network 842, user/resource 848, and user/user 860 interactions described in greater detail herein. As an example, a user/user 860 interaction may include an interaction between user 'A' 802 and 'B' 862.

In certain embodiments, the point of observation may include cyber behavior of various kinds within an internal 844 network. As an example, the cyber behavior within an internal 844 network may include a user accessing a particular internal system 854 or data store 856. In certain embodiments, the point of observation may include cyber behavior of various kinds within an external 846 network. As an example, the cyber behavior within an external 846 network may include a user's social media activities or participation in certain user forums. Those of skill in the art will recognize that many such examples of user/device 830, user/network 842, user/resource 848, and user/user 860 interactions are possible. Accordingly, the foregoing is not intended to limit the spirit, scope or intent of the invention.

In certain embodiments, the security analytics system 118 may be implemented to process certain contextual information to ascertain the identity of an entity at a particular point in time. In certain embodiments, the contextual information may include location data 836. In certain embodiments, the endpoint device 304 may be configured to receive such location data 836, which is used as a data source for determining the user's location 824.

In certain embodiments, the location data 836 may include Global Positioning System (GPS) data provided by a GPS satellite 838. In certain embodiments, the location data 836 may include location data 836 provided by a wireless network, such as from a cellular network tower 840. In certain embodiments (not shown), the location data 836 may include various Internet Protocol (IP) or other network address information assigned to the endpoint 304 or edge 202 device. In certain embodiments (also not shown), the location data 836 may include recognizable structures or physical addresses within a digital image or video recording.

In certain embodiments, the endpoint devices 304 may include an input device (not shown), such as a keypad, magnetic card reader, token interface, biometric sensor, digital camera, video surveillance camera, and so forth. In certain embodiments, such endpoint devices 304 may be directly, or indirectly, connected to a particular facility 852 or system 854. As an example, the endpoint device 304 may be directly connected to an ingress/egress system, such as an electronic lock on a door or an access gate of a parking garage. As another example, the endpoint device 304 may be indirectly connected to a physical security mechanism through a dedicated security network.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented to use various event data stored in a repository of persistent event data 670 to perform certain probability distribution analyses, described in greater detail herein.

In certain embodiments, the security analytics system 118 may be implemented as a risk-adaptive protection service 864. In certain embodiments, the risk-adaptive protection service 864 may be implemented in a cloud environment familiar to those of skill in the art. Those of skill in the art will recognize that many such embodiments are possible. Accordingly, the foregoing is not intended to limit the spirit, scope or intent of the invention.

Figure 9:
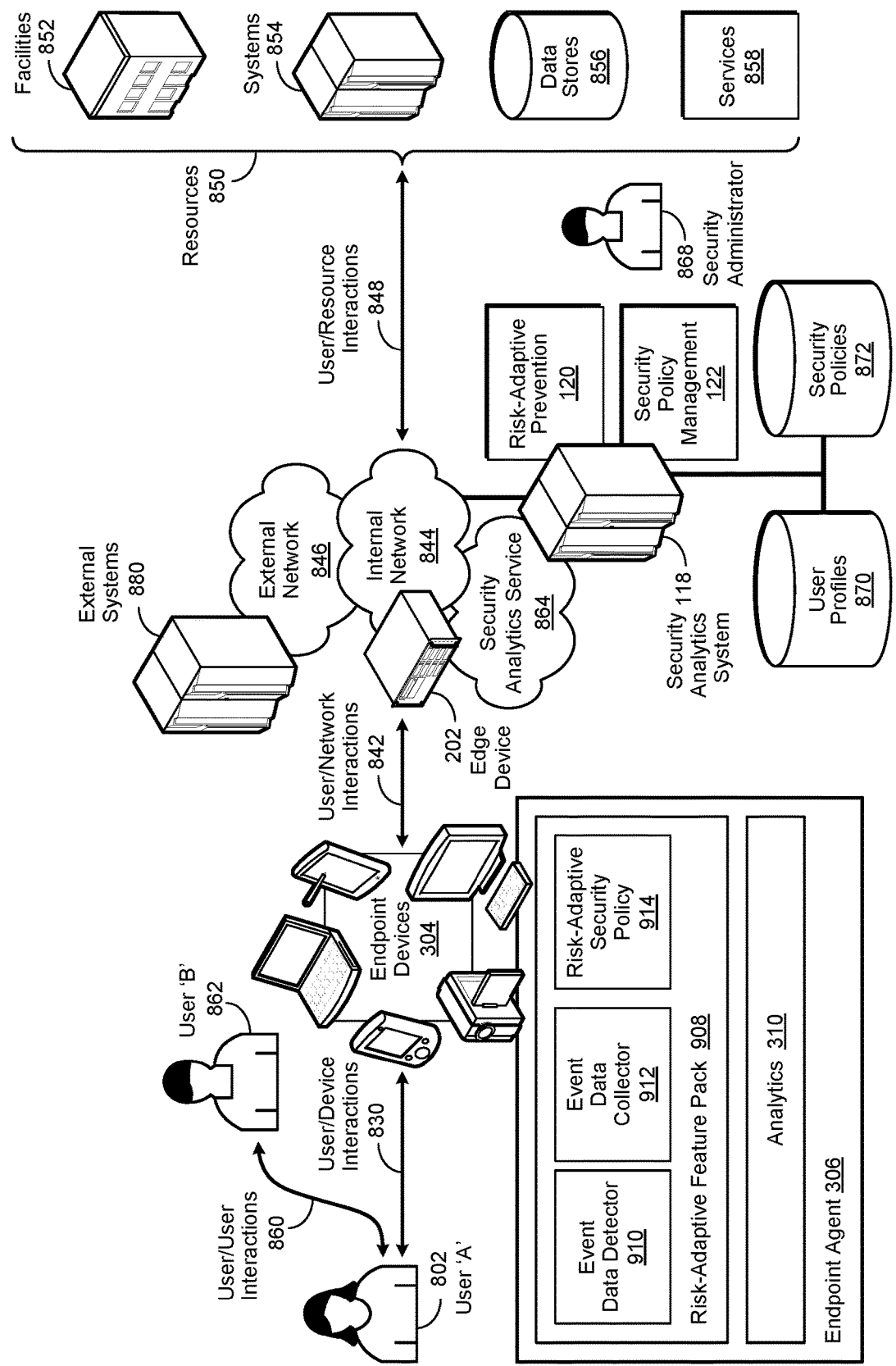
FIG. 9 is a simplified block diagram of a risk-adaptive environment for adaptively monitoring risk associated with an endpoint.

FIG. 9 is a simplified block diagram of a risk-adaptive environment implemented in accordance with an embodiment of the invention for adaptively assessing endpoint risk. In certain embodiments, the endpoint may include an endpoint device 304 implemented in combination with an endpoint agent 306, as described in greater detail herein. In certain embodiments, a security analytics system 118 may be implemented to monitor user behavior associated with a user, such as user 'A' 802. In certain embodiments, the user behavior is monitored during user/device 830, user/network 842, user/resource 848, and user/user 860 interactions. In certain embodiments, the user/user 860 interactions may occur between a first user, such as user 'A' 802, and a second user, such as user 'B' 862.

In certain embodiments, as likewise described in greater detail herein, the endpoint agent 306 may be implemented on the endpoint device 304 to perform the user behavior monitoring. In certain embodiments, the user behavior may be monitored by the endpoint agent 306 during user/device 830 interactions between a user, such as user 'A' 902, and an endpoint device 304. In certain embodiments, the user behavior may be monitored by the endpoint agent 306 during user/network 842 interactions between user 'A' 902 and a network, such as an internal 844 or external 846 network.

In certain embodiments, the security analytics 118 system may be implemented to include a risk-adaptive prevention 120 module, a security policy management 122 module, or a combination thereof, as described in greater detail herein. In various embodiments, certain risk-adaptive protection operations, likewise described in greater detail herein, may be performed by the risk-adaptive prevention 120 module to adaptively assess risk corresponding to an entity and an associated endpoint. In certain embodiments, the endpoint agent 306 may be implemented in combination with the security analytics system 118, the risk-adaptive 120 module, and the security policy management 122 module to adaptively assess risk associated with an endpoint.

In certain embodiments, the endpoint agent 306 may be implemented to include an analytics 310 module and a risk-adaptive feature pack 908. As used herein, a risk-adaptive feature pack 908 broadly refers to an endpoint agent 306 module implemented to perform security management functionalities, described in greater detail herein, associated with certain risk-adaptive operations, likewise described in greater detail herein. In certain embodiments, the risk-adaptive feature pack 908 may be further implemented to include an event data detector 910 module, an event data collector 912 module, and a risk-adaptive security policy 914. As used herein, a risk-adaptive security policy 914 broadly refers to a security policy implemented to be revised by the security analytics system 118 to adaptively remediate risk associated with certain user behaviors.

In certain embodiments, the event data detector 910 module may be implemented to detect event data, described in greater detail herein, resulting from user/device 830, user/network 842, user/resource 848, and user/user 860 interactions. In certain embodiments, the event data collector 912 module may be implemented to collect the event data detected by the event data detector 910 module into a stream of event data, likewise described in greater detail herein. In certain embodiments, the endpoint agent 306 may be implemented to communicate the stream of event data collected by the event data collector 912 module to the security analytics 118 system.

Referring now to FIG. 9, adaptive endpoint risk assessment operations are begun in certain embodiments by first selecting an entity, such as user 'A' 802, and an associated endpoint device 304, to monitor. In certain embodiments, the selected entity can be an entity other than a user, as described in greater detail herein. The current risk level of the selected entity is then determined, followed by selecting the frequency and duration of endpoint monitoring intervals. In various embodiments, the method by which the frequency and duration of endpoint monitoring intervals is determined is a matter of design choice.

User behavior, described in greater detail herein, associated with the selected entity is then collected for the duration of the monitoring interval. In certain embodiments, the user behavior associated with the selected entity may be collected by an endpoint agent 306. In certain embodiments, the user behavior may correspond to event data, as likewise described in greater detail herein. In certain embodiments, the event data may be detected by the event data detector 910 module, and once detected, collected by the event data collector 912 module.

In certain embodiments, the event data collected by the event data collector 912 module may be provided by the endpoint agent 306 to the security analytics system 118 for processing. In certain embodiments, the security analytics system 118 may be implemented to process the collected event data provided by the endpoint agent 306 to generate a risk score for the current endpoint monitoring interval, as described in greater detail herein. In turn, the current risk score is then compared to historical risk scores, followed by a determination being made whether the current risk score indicates a change in the selected entity's risk level.

In certain embodiments, the security analytics system 118 may be implemented to perform the comparison between the current risk score and the historical risk scores. In certain embodiments, the risk score may be implemented to correspond to a risk level associated with the entity. As an example, a risk score between '0' and '20' may correspond to a risk level of '1', a risk score between '21' and '40' may correspond to a risk level of '2', and so forth.

If it is determined that the risk level of the selected entity has not changed, then a determination is made whether to change the current endpoint monitoring settings. If so, then they are changed and adaptive endpoint risk assessment operations are continued. In certain embodiments, changes to the current endpoint monitoring settings are commensurate with a risk assessment resulting from the comparison between the current risk score and the historical risk scores.

As an example, the risk scores for a first entity may have gradually declined over the last six endpoint monitoring intervals (e.g., '32', '28', '27', '24', '23', '20'). Accordingly, the duration of the endpoint's monitoring intervals may be decreased, its frequency decreased, or a combination thereof. As another example, the risk scores for a second entity may have been substantially the same (e.g., '21', '21', '20', '21', '20', '20') for over the a number of endpoint monitoring intervals. For the purposes of this disclosure, risk scores that are substantially the same are risk scores within +/−10% of the original risk score. Accordingly, the duration of the endpoint's monitoring intervals may remain the same, but its frequency may be decreased.

As yet another example, the risk scores for a third entity may have gradually increased (e.g., '32', '33', '34', '36', '37', '38') for over the same number of endpoint monitoring intervals. Accordingly, the duration of the endpoint's monitoring intervals may remain the same, but its frequency may be increased. As yet still another example, the risk scores for a fourth entity may have risen dramatically (e.g., '25', '26', '24', '24', '23', '47') during the current endpoint monitoring interval. Accordingly, the duration of the endpoint's monitoring intervals may be significantly increased, as well as its frequency. In various embodiments, the method by which a risk level, a corresponding risk score, or a combination thereof, is determined is a matter of design choice.

In certain embodiments, the risk-adaptive prevention 120 module may be implemented to perform the comparison between the current risk score and the historical risk scores. In certain embodiments, the risk-adaptive prevention 120 module may be implemented to make changes to the current endpoint monitoring settings that are commensurate with a risk assessment resulting from the comparison between the current risk score and the historical risk scores. In various embodiments, changes made to the current endpoint monitoring settings by the risk adaptive prevention 120 module may be the result of the performance of certain risk-adaptive operations, described in greater detail herein.

However, if it is determined that the risk level associated with the entity has changed during the current endpoint monitoring interval, then certain risk-adaptive operations, described in greater detail herein, may be performed. In certain embodiments, the risk-adaptive operations may be commensurate with the change in the risk level associated with an entity. As an example, an entity with gradually declining risk scores may be assigned a lower risk level. As another example an entity with gradually increasing risk scores may be assigned a slightly higher risk score. As yet another example, an entity with a risk score that has dramatically risen during the current endpoint monitoring interval may be assigned a very high risk score.

In certain embodiments, changes to the risk score of an entity associated with a particular endpoint may result in revisions to the risk-adaptive security policy 914 implemented with its associated endpoint agent 306. In certain embodiments, such revisions to the risk-adaptive security policy 914 may be made by the risk adaptive prevention 120 module, the security policy management 122 module, or a combination thereof. In certain embodiments, the risk-adaptive prevention 120 module may be implemented to assess the risk of revising one or more rules, or actions, associated with a risk-adaptive security policy 914.

In certain embodiments, the determination of whether the assessed risk is acceptable is a matter of design choice. In certain embodiments, the determination may be made automatically, semi-automatically, or manually. As an example, the risk-adaptive prevention 120 module may be implemented to determine whether the assessed risk is within a particular risk range, or within certain security operational parameters, and if so, automatically decide the assessed risk is acceptable. As another example, the risk-adaptive prevention 120 module may be implemented to notify a security administrator 868 of the assessed risk. In this example, the security administrator 868 may decide whether or not the assessed risk is acceptable.

In certain embodiments, the risk-adaptive prevention 120 module may be implemented to generate revisions to one or more rules, or actions, associated with a risk-adaptive security policy 914. In certain embodiments, the security policy management 122 module may likewise be implemented to perform various risk-adaptive protection operations to revise a risk-adaptive security policy 914. In certain embodiments, the risk-adaptive protection operations performed by the security policy management 122 module may include using revisions generated by the risk-adaptive prevention 120 module to revise a risk-adaptive security policy 914. In certain embodiments, a copy of a revised risk-adaptive security policy 914 may be stored in a repository of security policies 872.

Certain embodiments of the invention reflect an appreciation that such revisions to the risk-adaptive security policy 914 may result in its violation. In certain embodiments, the violation of the risk-adaptive policy 914 may likewise result in the performance of certain risk-adaptive operations to remediate the risk associated with the cause of such a violation. In certain embodiments, the endpoint agent 306 may be implemented to determine if the risk-adaptive security policy 914 has been violated. In certain embodiments, the endpoint agent 306 may be implemented to notify the security analytics system 118 if the risk-adaptive security policy 914 has been violated.

Figure 10A:
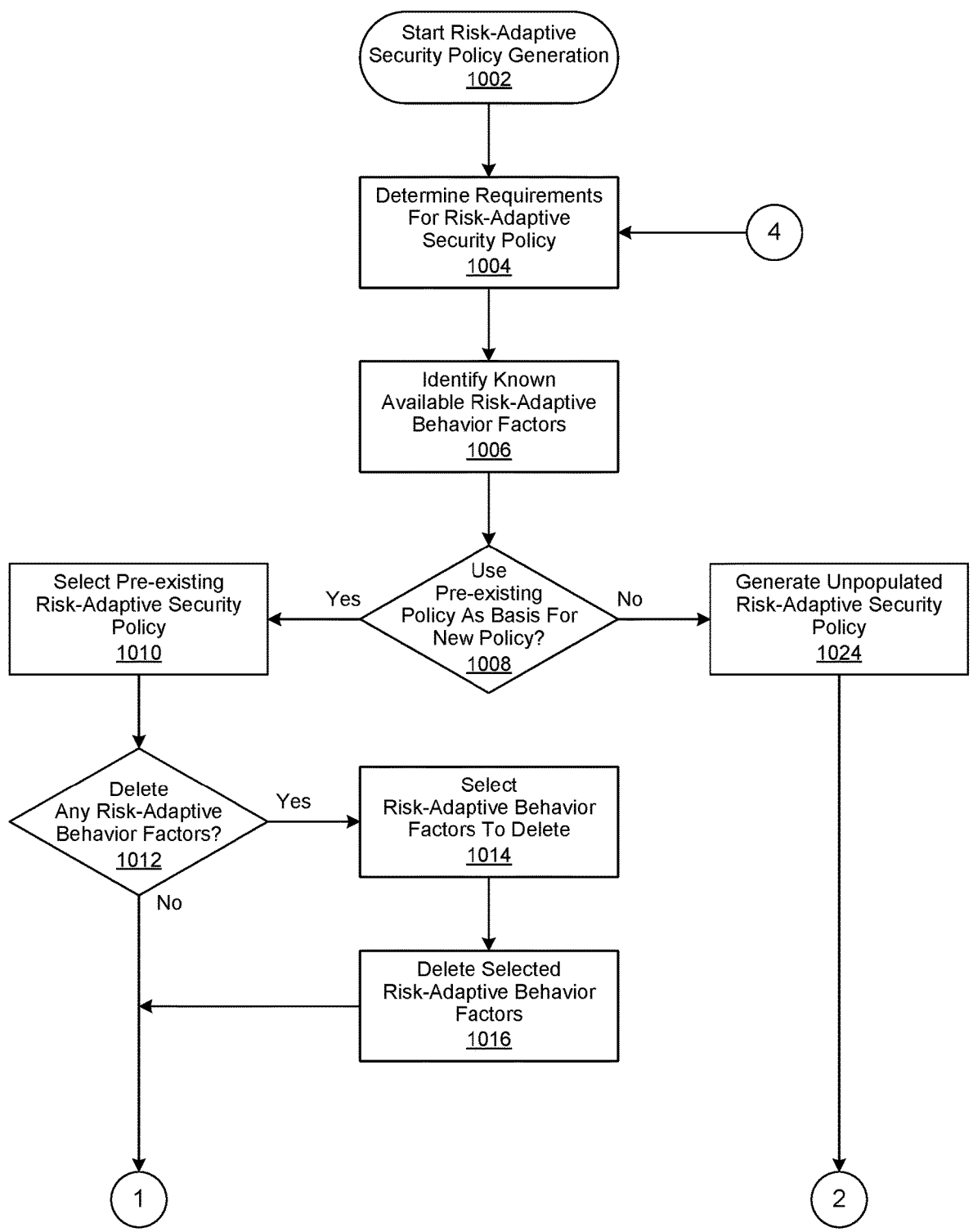
FIGS. 10a through 10c are a generalized flowchart of the performance of risk-adaptive security policy generation operations.
Figure 10B:
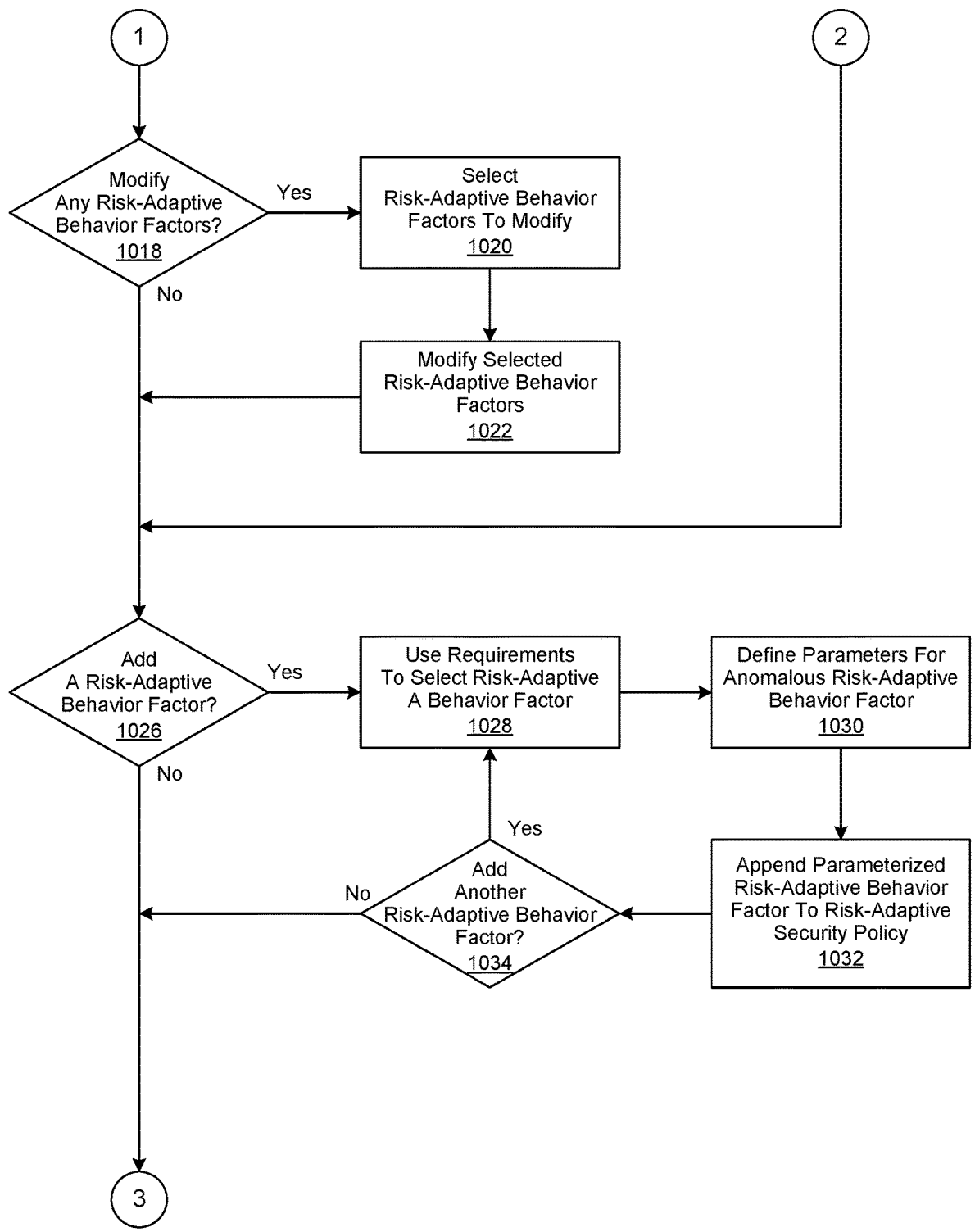
Figure 10C:
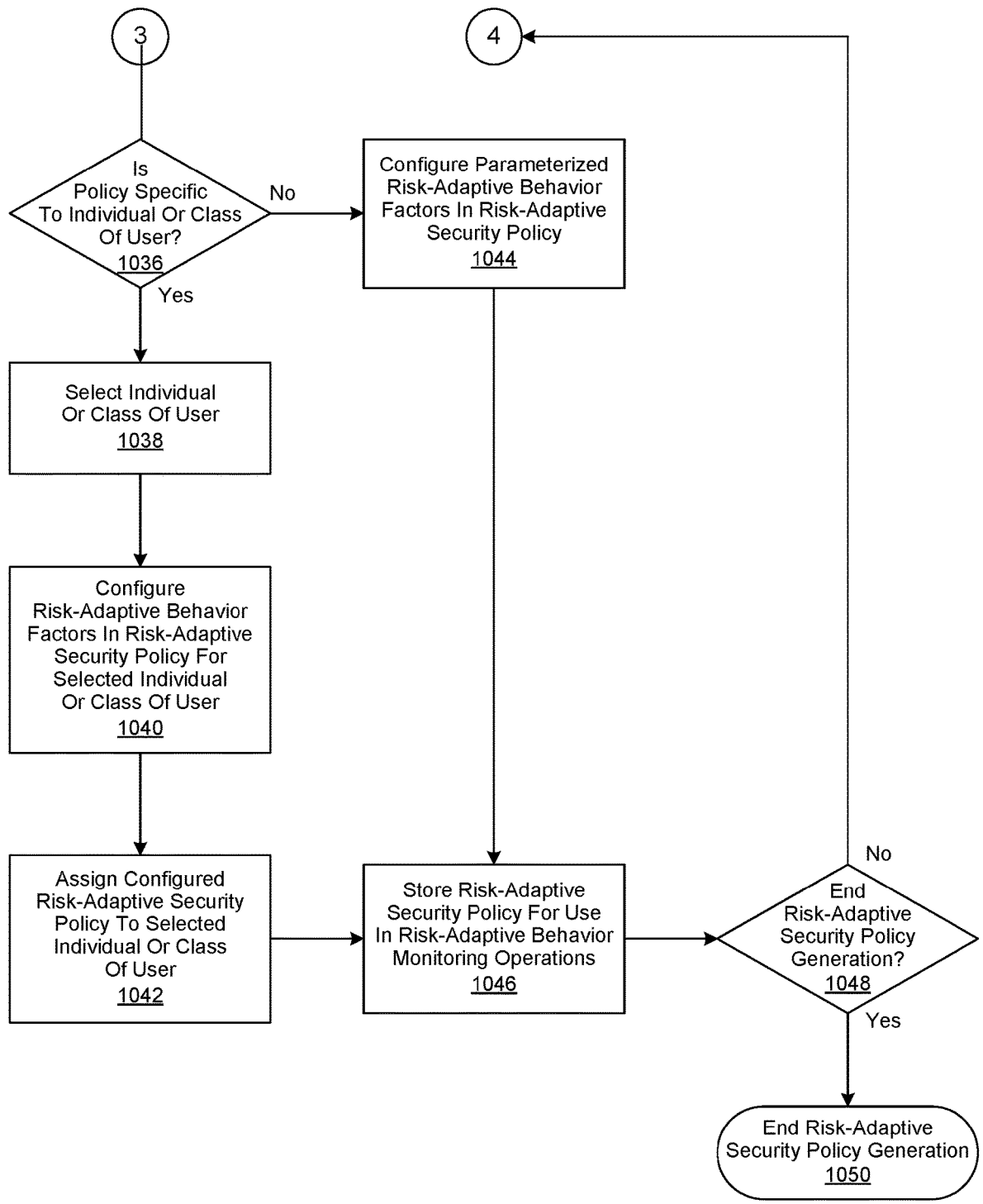

FIGS. 10a through 10c are a generalized flowchart of the performance of risk-adaptive security policy generation operations implemented in accordance with an embodiment of the invention. In this embodiment, risk-adaptive security policy generation operations are begun in step 1002, followed by determining the requirements of a risk-adaptive security policy in step 1004. Known available risk-adaptive behavior factors, described in greater detail herein, are identified in step 1006, followed by a determination being made in step 1008 whether to use a pre-existing risk-adaptive security policy as the basis for a new policy. If so, then a pre-existing risk-adaptive security policy is selected in step 1010, followed by a determination being made in step 1012 whether to delete any risk-adaptive behavior factors it may utilize. If so, then any relevant risk-adaptive behavior factors are selected in step 1014, followed by their deletion in step 1016.

Thereafter, or if it was decided in step 1012 to not delete any risk-adaptive behavior factors associated with the pre-existing risk-adaptive security policy, then a determination is made in step 1018 whether to modify any risk-adaptive behavior factors it may utilize. If so, then any relevant risk-adaptive behavior factors are selected in step 1020, followed by their modification in step 1022. However, if it was decided in step 708 to not use a pre-existing risk-adaptive security policy for a new policy, then an unpopulated risk-adaptive security policy is generated in step 1024.

Thereafter, or if it was decided in step 1018 to not modify any risk-adaptive behavior factors associated with the pre-existing risk-adaptive security policy, then a determination is made in step 1026 whether to add a risk-adaptive behavior factor. If so, then the requirements determined in step 1004 are used in step 1028 to select a risk-adaptive behavior factor, followed by defining parameters associated with the risk-adaptive behavior factor in step 1030. In various embodiments, the parameters are used by a risk-adaptive behavior system, described in greater detail herein, to identify anomalous and/or risky cyber behavior. In these embodiments, the parameters, and their associated definitions, are a matter of design choice.

The parameterized risk-adaptive behavior factor is then appended to the risk-adaptive security policy in 1032, followed by a determination being made in step 1034 whether to add another risk-adaptive behavior factor to the risk-adaptive security policy. If so, then the process is continued, proceeding with step 1028. Otherwise, or if it was decided in step 1026 not to add a risk-adaptive behavior factor, then a determination is made in step 1036 whether the risk-adaptive security policy is specific to an individual or class of user. If so, then an individual or class of user is selected in step 1038 and the risk-adaptive security policy is configured accordingly in step 1040. In certain embodiments, the method by which an individual or class of user is selected, and the risk-adaptive security policy is configured, is a matter of design choice.

The configured risk-adaptive security policy is then assigned to the selected individual or class of user in step 1042. However, if it was decided in step 1036 that the risk-adaptive security policy was not specific to an individual or class or user, then the parameterized risk-adaptive behavior factors in the risk-adaptive security policy are configured in step 1044. Thereafter, or after the risk-adaptive security policy is assigned to a specific individual or class of user in step 1042, the risk-adaptive security policy is stored in step 1046 for use in risk-adaptive behavior system operations.

In one embodiment, the risk-adaptive security policy is stored in a repository of risk-adaptive security policies. In another embodiment, the repository of risk-adaptive security policies is implemented for use by a single security analytics system. In yet another embodiment, the repository of risk-adaptive security policies is implemented for use by a plurality of security analytics systems. A determination is then made in step 1048 whether to end risk-adaptive security policy operations. If not, the process is continued, proceeding with step 1004. Otherwise, risk-adaptive security policy generation operations are ended in step 1050.

Figure 11:
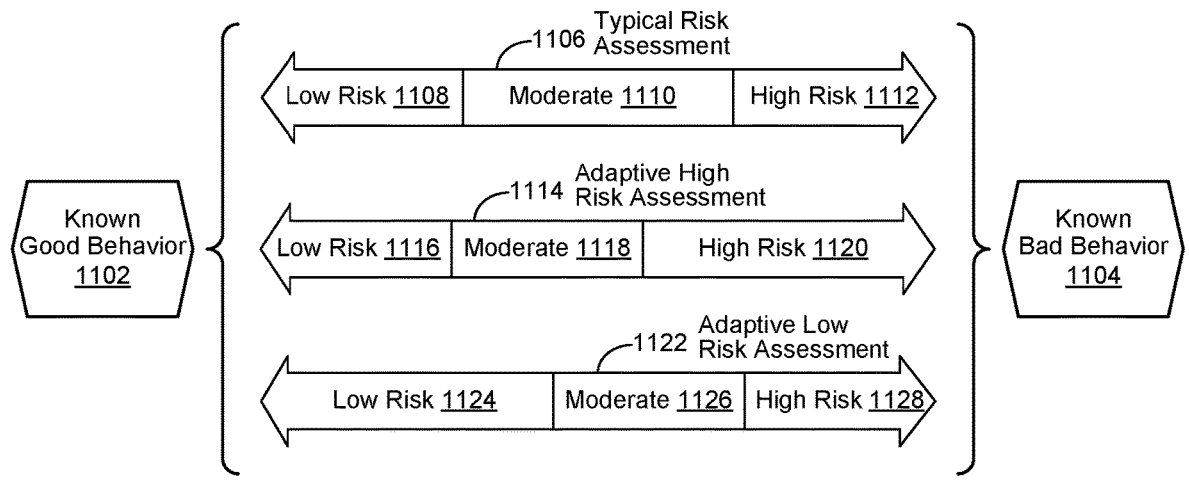
FIG. 11 is a simplified block diagram of the operation of a security analytics system to adaptively assess risk associated with a user behavior.

FIG. 11 is a simplified block diagram of the operation of a security analytics system implemented in accordance with an embodiment of the invention to adaptively assess risk associated with a user behavior. In this embodiment, the user behavior is monitored and compared to known good behavior 1102 and known bad behavior 1104. In typical risk assessment 1106 approaches, low 1108, moderate 1110, or high 1112 risk user behavior is generally determined by using fairly inflexible security policies, which are typically used to enact relatively static responses.

As an example, a security policy implemented for access control may have a list of actions a particular user can do and a list of things they cannot. Ordinarily, the actions in those lists are static and don't change, regardless of the particular user behavior being enacted by the user. However, perhaps they should change, or adapt, if it is determined the user behavior being enacted by the user has changed, and as a result, represents a higher risk To continue the example, a user may be perusing various resources and happens to access a webpage, such as a shopping site, that contains certain objects. Typical security approaches assume some portion of those objects to be good, a small number are known to be bad, and the remainder suspicious. Consequently, there is a continuum of objects, some assumed to be good, some undetermined, and the rest known to be bad. It will be appreciated that the determination of what is considered to be good, undetermined or bad is oftentimes fairly arbitrary.

In certain embodiments, contextual information associated with the user behavior being enacted by the user is collected and processed to adaptively respond to changes in the user's current user behavior. In continuance of the example, the user may change their user behavior to access internal business resources. In this example, accessing internal business resources is contextual information that may represent the potential for higher risk. As a result, a risk-adaptive behavior system may be implemented in certain embodiments to respond with an adaptive high risk assessment 1114. In certain embodiments, the adaptive high risk assessment 1114 is generated by a security analytics system, described in greater detail herein. Consequently, the adaptive high risk assessment 1114 may indicate a larger percentage of certain user behavior as high 1120 risk, and a smaller percentage as low 1116 or moderate 1118 risk.

In further continuance of the example, the user may further change their user behavior to access an external new site. As before, the user's access of an external news site is contextual information that may represent the likelihood of lower risk. As a result, the risk-adaptive behavior system may be implemented to respond with an adaptive low risk assessment 1122, which may indicate a larger percentage of certain user behavior as low 1124 risk, and a smaller percentage as moderate 1126 or high 1128 risk.

Certain embodiments of the invention reflect an appreciation that without the described adaptive behavior, the operational overhead administering user security would be high, as all user interactions related to their user behavior would continue to be monitored. However, the cost of administering user security would decrease when the user was no longer interacting with internal resources. Consequently, risk tolerance can be dynamically adjusted according to the context of a given user activity.

More particularly, if the user's activity is primarily internal to the organization, then some risk can be tolerated. However, if the user's activity is primarily external to the organization, then it is possible that essentially all risk can be tolerated. Furthermore, the user experience may be more pleasant during non-organization activities, as fewer security controls may be applied or experienced. Moreover, the risk assessment becomes dynamic, according to the identity of the user, the resources being accessed, their respective user behavior, and corresponding points of observation.

Figure 12:
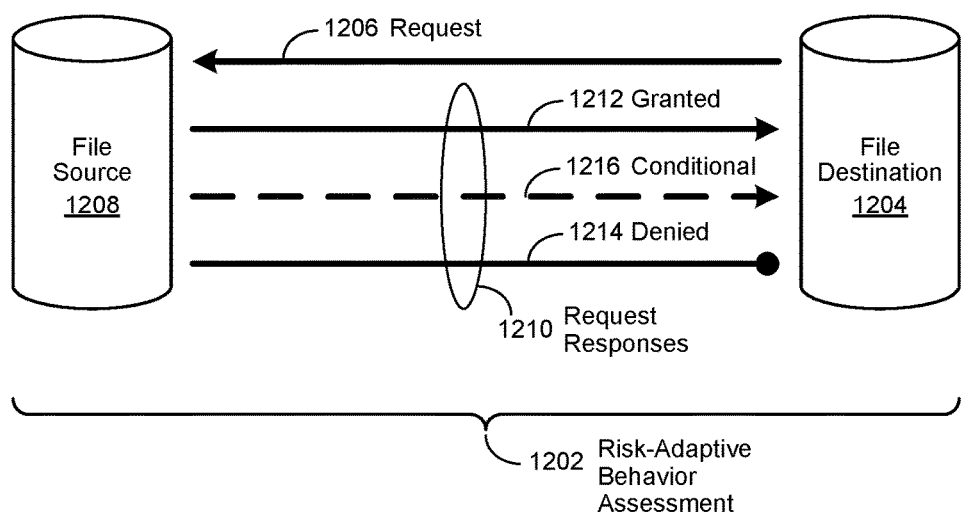
FIG. 12 is a simplified block diagram of the operation of a security analytics system to adaptively respond to a user request.

FIG. 12 is a simplified block diagram of the operation of a security analytics system implemented in accordance with an embodiment of the invention to adaptively respond to a user request. In this embodiment, a user may place a request 1206 to download a file from a file source 1208 to a file destination 1204, such as a USB drive. In traditional security approaches, the owner of the requested file may have a single security rule, which would be a granted 1212, or denied 1214, request response 1210 as to whether the user was allowed to download the file.

In certain embodiments, a risk-adaptive security policy, as described in greater detail herein, may be implemented such that the user's request 1206 to download the requested file is typically granted 1212. However, the user may have recently updated their online resume as well as begun to take random days off, which may imply a flight risk. By extension, the user behavior and other actions associated with the user may likewise imply the user's intent to take proprietary information with them to a new job. Consequently, various risk-adaptive behavior approaches, described in greater detail herein, may yield a denied 1214 request response 1210 due to the associated context of their user behavior, other actions, or a combination thereof.

Alternatively, a risk-adaptive security policy may be implemented in various embodiments to provide a conditional 1216 request response 1210. As an example, the requested file may be encrypted such that it can only be opened on a corporate computer. Furthermore, attempting to open the file on a non-corporate computer may result in a message being sent to a security administrator. Likewise, a single file being downloaded may appear as good behavior, yet multiple sequential downloads may appear suspicious, especially if the files do not appear to be related, or possibly, if they do. From the foregoing, it will be appreciated that risk-adaptive behavior is not necessarily based upon an atomic action, but rather a multiplicity of factors, such as contextual information associated with particular user behavior.

Figure 13:
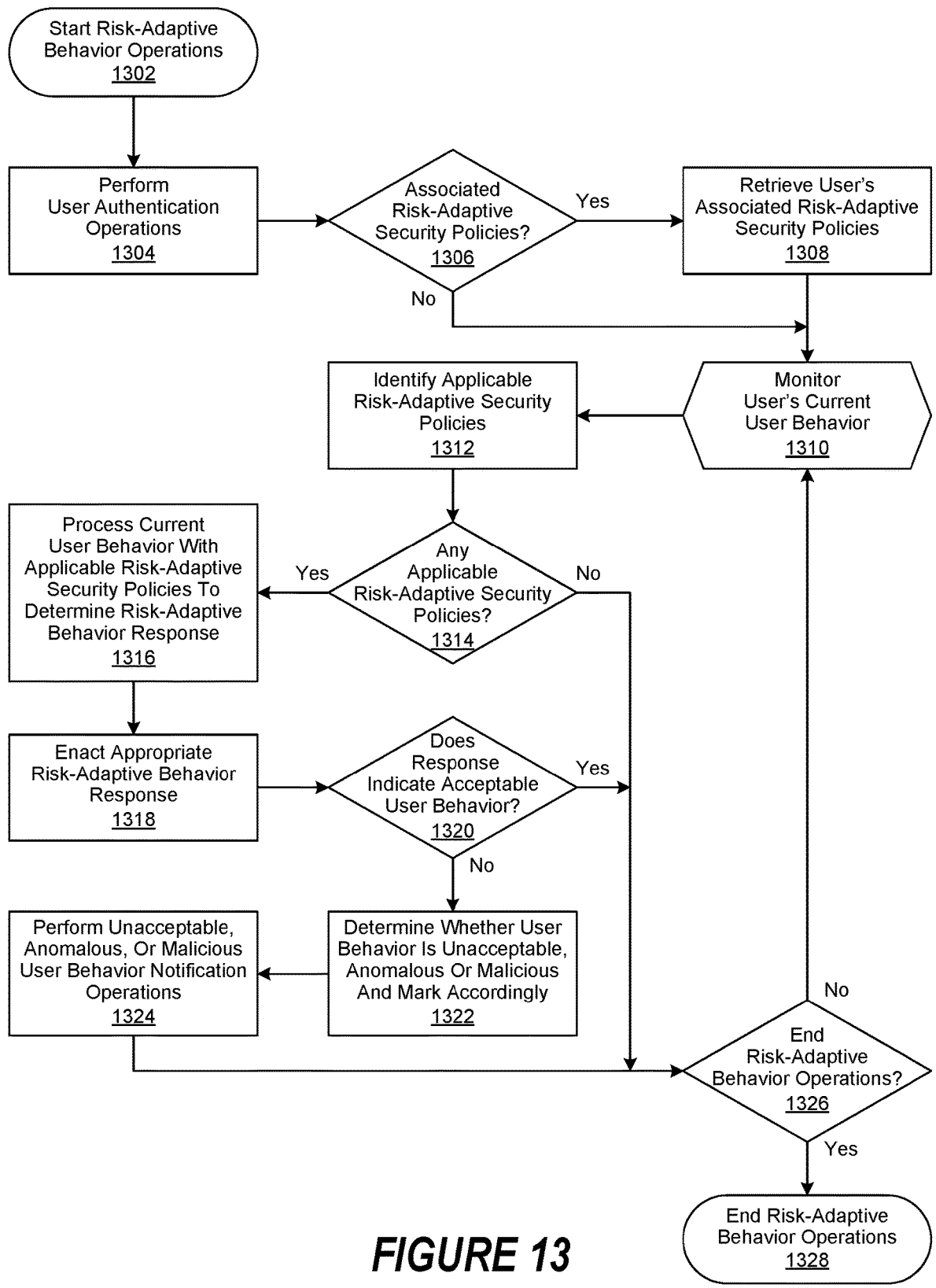
FIG. 13 is a generalized flowchart of the performance of security analytics system operations to adaptively manage user behavior risk.

FIG. 13 is a generalized flowchart of the performance of security analytics system operations implemented in accordance with an embodiment of the invention to adaptively manage user behavior risk. In this embodiment, risk-adaptive behavior operations are begun in step 1302, followed by the performance of user authentication operations, familiar to those of skill in the art, in step 1304. A determination is then made in step 1306 whether the user has one or more associated risk-adaptive security policies. If so, then they are retrieved for use in step 1308. Thereafter, or if it was determined in step 1306 the user has no associated risk-adaptive security policies, the user's user behavior is monitored in step 1310.

The user's current user behavior is then processed in step 1312 to identify any applicable risk-adaptive security policies that may apply. A determination is then made in step 1314 whether any applicable risk-adaptive security policies have been identified. If not, a determination is made in step 1326 whether to end risk-adaptive behavior system operations. If not, then the process is continued, proceeding with step 1310. Otherwise, risk-adaptive behavior system operations are ended in step 1328.

However, if it is determined in step 1314 that one or more applicable risk-adaptive security policies have been identified, then they are used in step 1316 to process the user's current user behavior to determine an appropriate risk-adaptive behavior response. The appropriate risk-adaptive behavior response is then enacted in step 1318, followed by a determination being made in step 1320 whether the risk-adaptive behavior response enacted in step 1318 indicates acceptable user behavior.

If so, then the process is continued, proceeding with step 1326. Otherwise the user's current user behavior is determined to be unacceptable, anomalous, or malicious and marked accordingly in step 1322. Unacceptable, anomalous, or malicious user behavior notification operations are then performed in step 1324. In one embodiment, the unacceptable, anomalous, or malicious user behavior is stored for later review. In another embodiment, a security administrator is notified of the unacceptable, anomalous, or malicious user behavior. Thereafter, the process is continued, proceeding with step 1326.

Figure 14:
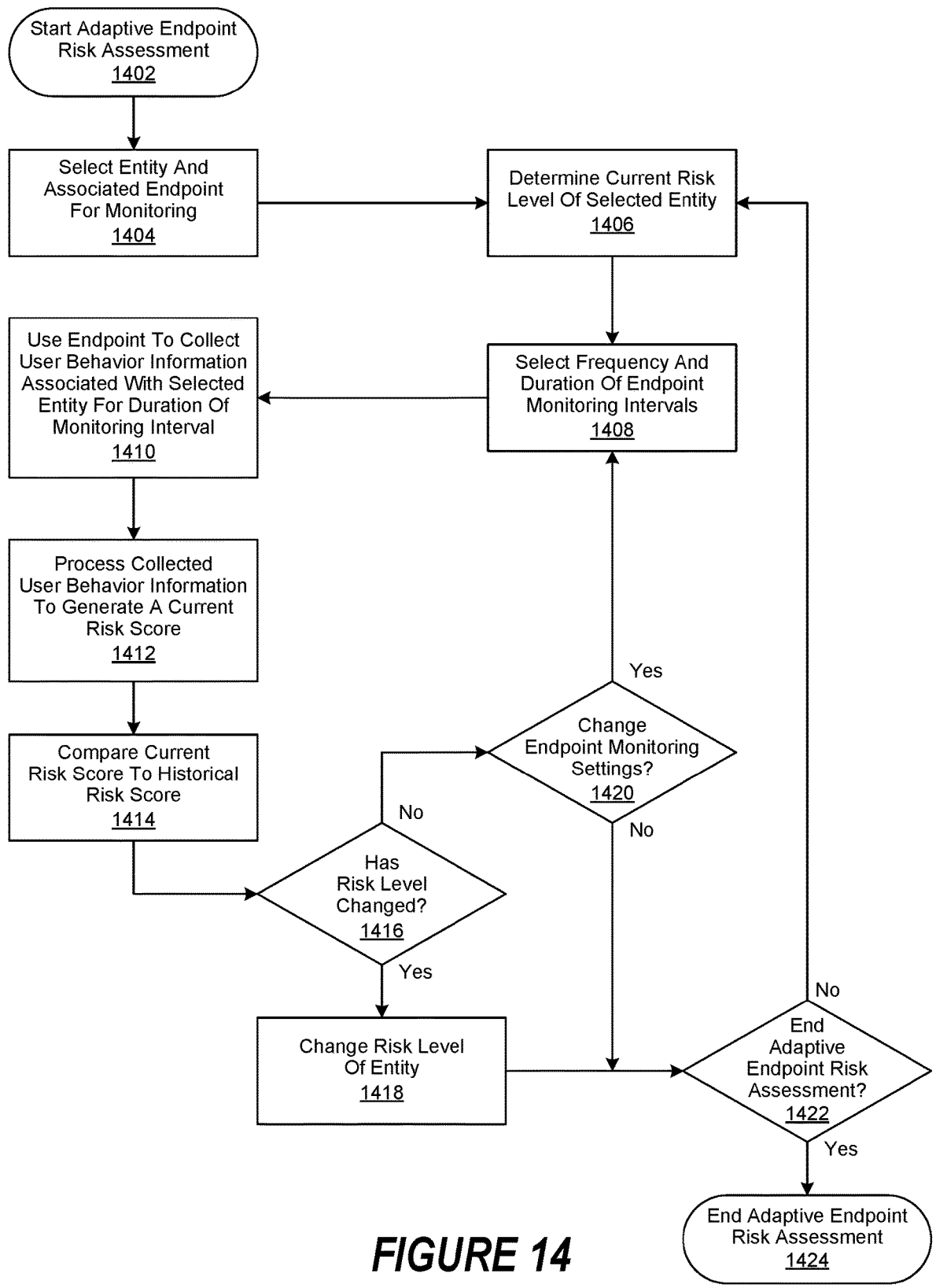
FIG. 14 is a generalized flowchart of the performance of adaptive endpoint risk assessment operations.

FIG. 14 is a generalized flowchart of the performance of adaptive endpoint risk assessment operations implemented in accordance with an embodiment of the invention. In this embodiment, adaptive endpoint risk assessment operations are begun in step 1402, followed by the selection of an entity and an associated endpoint to monitor in step 1404. The current risk level of the selected entity is determined in step 1406, followed by selecting the frequency and duration of endpoint monitoring intervals in step 1408. In various embodiments, the method by which the frequency and duration of endpoint monitoring intervals is determined is a matter of design choice.

The endpoint is then used in step 1410 to collect user behavior associated with the selected entity for the duration of the monitoring interval. Then, in step 1412, the collected user behavior information is processed to generate a current risk score, as described in greater detail herein. The current risk score is then compared to historical risk scores in step 1414, followed by a determination being made in step 1416 whether the current risk score indicates a change in the selected entity's risk level.

If so, then the risk level of the selected entity is changed in step 1418, followed by a determination being made in step 1422 whether to end adaptive endpoint risk assessment operations. If not, then the process is continued, proceeding with step 1406. However, if it was determined in step 1416 that the selected entity's risk level has not If not, then a determination is made in step 1420 whether to change the current endpoint monitoring settings. If so, then the process is continued, proceeding with step 1408. Otherwise, the process is continued, proceeding with step 1422.

Figure 15:
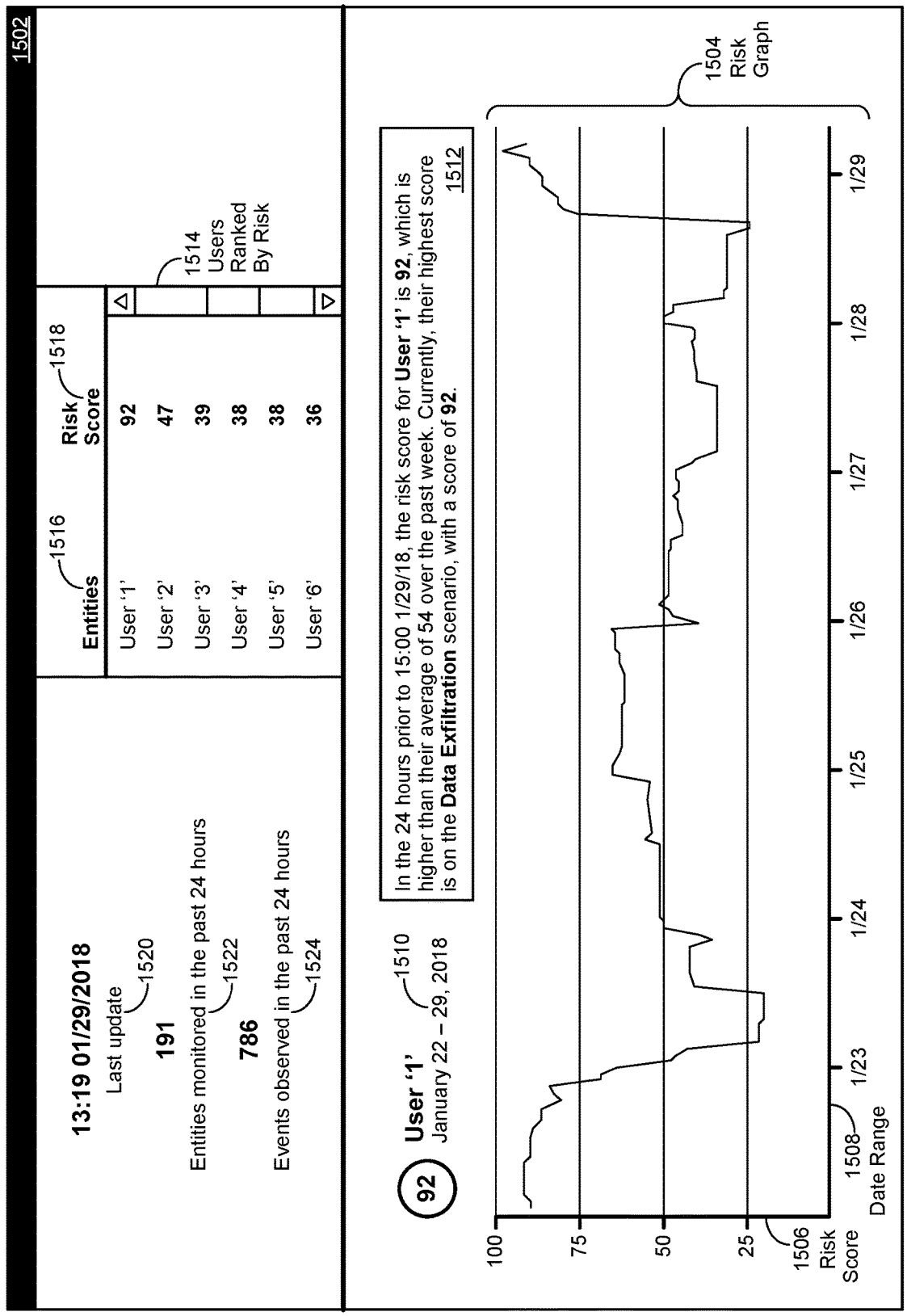
FIG. 15 shows the operation of a security analytics system within a user interface implemented in accordance with an embodiment of the invention.

FIG. 15 shows the operation of a security analytics system within a user interface implemented in accordance with an embodiment of the invention. In this embodiment, a risk graph 1504 displayed within a user interface (UI) window 1502 depicts the fluctuation of risk scores 1506 at different points in time within a particular date range 1508. In certain embodiments, the fluctuation of risk scores 1506 displayed within the risk graph 1504 corresponds to the potential risk associated with a particular user 1510 at various points in time within the date range 1508. In certain embodiments, a risk details window 1512 corresponding to the user 1510 may be displayed within the UI window 1502.

In certain embodiments, summary information may likewise be displayed within the UI window 1502. For example, as shown in FIG. 15, the last update 1520 of the risk graph 1504, the number of entities 1522 monitored in the last 24 hours, and the number of events 1524 observed in the last 24 hours may be displayed. In certain embodiments, individual entities 1516 being monitored, and their associated risk scores 1518, may be displayed in ranked order 1514 by their corresponding risk scores within the UI window 1502.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for adaptively assessing risk associated with an endpoint, comprising:
    determining a risk level corresponding to an entity associated with an endpoint, the endpoint comprising an endpoint agent executing on a hardware processor of the endpoint;
    selecting a frequency and a duration of an endpoint monitoring interval;
    collecting user behavior associated with the entity for the duration of the endpoint monitoring interval via the endpoint;
    processing the user behavior to generate a current risk score for the entity;
    comparing the current risk score of the entity to a historical risk score of the entity to determine whether a risk score of the entity has changed;
    changing the risk score of the entity to the current risk score when the risk score of the entity has changed;
    decreasing the frequency of the endpoint monitoring interval when the current risk scores of the entity remain substantially the same over a plurality of endpoint monitoring intervals;
    increasing the frequency of the endpoint monitoring interval when the current risk scores of the entity increase over a plurality of endpoint monitoring intervals; and,
    remediating a risk associated with the entity, the remediating the risk being based upon the risk score of the entity, the remediating the risk being performed via one of the endpoint and a security analytics system, the security analytics system executing on a hardware processor of an information handling system.

2. The method of claim 1, wherein:
the endpoint comprises a risk-adaptive feature pack.

3. The method of claim 2, wherein:
the risk-adaptive feature pack comprises at least one of an event data detector module, an event data collector module and a risk-adaptive security policy.

4. The method of claim 1, further comprising:
decreasing the duration of the endpoint monitoring interval when the current risk scores of the user decline over a plurality of endpoint monitoring intervals.

5. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
    determining a risk level corresponding to an entity associated with an endpoint the endpoint comprising an endpoint agent executing on a hardware processor of the endpoint;
    selecting a frequency and a duration of an endpoint monitoring interval;

collecting user behavior associated with the entity for the duration of the endpoint monitoring interval via the endpoint;

processing the user behavior to generate a current risk score for the entity;

comparing the current risk score of the entity to a historical risk score of the entity to determine whether a risk score of the entity has changed;

changing the risk score of the entity to the current risk score when the risk score of the entity has changed;

decreasing the frequency of the endpoint monitoring interval when the current risk scores of the entity remain substantially the same over a plurality of endpoint monitoring intervals;

increasing the frequency of the endpoint monitoring interval when the current risk scores of the entity increase over a plurality of endpoint monitoring intervals; and, remediating a risk associated with the entity, the remediating the risk being based upon the risk score of the entity, the remediating the risk being performed via one of the endpoint and a security analytics system, the security analytics system executing on a hardware processor of an information handling system.

6. The system of claim 5, wherein:

the endpoint comprises a risk-adaptive feature pack.

7. The system of claim 6, wherein:

the risk-adaptive feature pack comprises at least one of an event data detector module, an event data collector module and a risk-adaptive security policy.

8. The system of claim 5, wherein the instructions executable by the processor are further configured for:

decreasing the duration of the endpoint monitoring interval when the current risk scores of the user decline over a plurality of endpoint monitoring intervals.

9. A non-transitory, computer-readable storage medium embodying computer program code, the computer program code comprising computer executable instructions configured for:

determining a risk level corresponding to an entity associated with an endpoint;

selecting a frequency and a duration of an endpoint monitoring interval;

collecting user behavior associated with the entity for the duration of the endpoint monitoring interval via the endpoint, the endpoint comprising an endpoint agent executing on a hardware processor of the endpoint;

processing the user behavior to generate a current risk score for the entity;

comparing the current risk score of the entity to a historical risk score of the entity to determine whether a risk score of the entity has changed;

changing the risk score of the entity to the current risk score when the risk score of the entity has changed;

decreasing the frequency of the endpoint monitoring interval when the current risk scores of the entity remain substantially the same over a plurality of endpoint monitoring intervals;

increasing the frequency of the endpoint monitoring interval when the current risk scores of the entity increase over a plurality of endpoint monitoring intervals; and, remediating a risk associated with the entity, the remediating the risk being based upon the risk score of the entity, the remediating the risk being performed via one of the endpoint and a security analytics system, the security analytics system executing on a hardware processor of an information handling system.

10. The non-transitory, computer-readable storage medium of claim 9, wherein:

the endpoint comprises a risk-adaptive feature pack.

11. The non-transitory, computer-readable storage medium of claim 10, wherein:

the risk-adaptive feature pack comprises at least one of an event data detector module, an event data collector module and a risk-adaptive security policy.

12. The non-transitory, computer-readable storage medium of claim 9, wherein the computer executable instructions are further configured for:

decreasing the duration of the endpoint monitoring interval when the current risk scores of the user decline over a plurality of endpoint monitoring intervals.

13. The non-transitory, computer-readable storage medium of claim 9, wherein:

the computer executable instructions are deployable to a client system from a server system at a remote location.

14. The non-transitory, computer-readable storage medium of claim 9, wherein:

the computer executable instructions are provided by a service provider to a user on an on-demand basis.

\* \* \* \* \*